US011234194B2

(12) United States Patent
Beale et al.

(10) Patent No.: US 11,234,194 B2
(45) Date of Patent: Jan. 25, 2022

(54) TO REDUCE INTERFERENCE BETWEEN WAKE-UP SIGNALLING TRANSMISSIONS FROM DIFFERENT BASE STATIONS

(71) Applicant: Sony Corporation, Tokyo (JP)

(72) Inventors: Martin Warwick Beale, Basingstoke (GB); Shin Horng Wong, Basingstoke (GB); Samuel Asangbeng Atungsiri, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/764,404

(22) PCT Filed: Nov. 9, 2018

(86) PCT No.: PCT/EP2018/080807
§ 371 (c)(1),
(2) Date: May 15, 2020

(87) PCT Pub. No.: WO2019/096704
PCT Pub. Date: May 23, 2019

(65) Prior Publication Data
US 2020/0359323 A1    Nov. 12, 2020

(30) Foreign Application Priority Data
Nov. 17, 2017   (EP) ..................................... 17202451

(51) Int. Cl.
*H04W 76/27*      (2018.01)
*H04W 52/02*      (2009.01)
(Continued)

(52) U.S. Cl.
CPC ..... *H04W 52/0235* (2013.01); *H04J 13/0062* (2013.01); *H04W 16/14* (2013.01); *H04W 52/0229* (2013.01); *H04W 76/27* (2018.02)

(58) Field of Classification Search
CPC ............. H04W 16/14; H04W 52/0216; H04W 52/0225; H04W 52/0229; H04W 52/0235; H04W 76/27; H04W 76/28
(Continued)

(56) References Cited

U.S. PATENT DOCUMENTS

2018/0249412 A1*   8/2018   Zhou ................. H04W 52/0216
2018/0270756 A1*   9/2018   Bhattad ................. H04W 76/27
(Continued)

FOREIGN PATENT DOCUMENTS

| WO | 2016/209726 A1 | 12/2016 |
| WO | 2016/209833 A1 | 12/2016 |
| WO | 2019/096858 A1 | 5/2019 |

OTHER PUBLICATIONS

International Search Report and Written Opinion dated Feb. 25, 2019 for PCT/EP2018/080807 filed on Nov. 9, 2018, 9 pages.
(Continued)

*Primary Examiner* — Harun Chowdhury
(74) *Attorney, Agent, or Firm* — Xsensus LLP

(57) ABSTRACT

A network access node for use in a wireless telecommunications system comprising the network access node and a terminal device, the network access node is operable to: transmit wake-up signalling for the terminal device in a wake-up signalling transmission period in advance of transmitting a paging message to indicate the terminal device should seek to decode the paging message, wherein the wake-up signalling comprises: first wake-up signalling transmitted in a first frequency band during a first transmission period in the wake-up signalling transmission period; and second wake-up signalling transmitted in a second frequency band during a second transmission period in the wake-up signalling transmission period.

19 Claims, 12 Drawing Sheets

(51) Int. Cl.
*H04J 13/00* (2011.01)
*H04W 16/14* (2009.01)

(58) Field of Classification Search
USPC .................. 370/311, 464; 375/132; 455/574
See application file for complete search history.

(56) References Cited

U.S. PATENT DOCUMENTS

2019/0103950 A1* 4/2019 Liu ....................... H04W 76/28
2019/0319666 A1* 10/2019 Alriksson ......... H04W 52/0229
2020/0029302 A1* 1/2020 Cox ................. H04W 52/0216

OTHER PUBLICATIONS

Qualcomm Incorporated, "Wake-up signal design," 3GPP TSG RAN WG1 Meeting #90bis, R1-1718142, Prague, Czechia, Oct. 9-13, 2017, 13 pages.

Ericsson, "Revised WID for Further Enhanced MTC for LTE," 3GPP TSG RAN Meeting #73, RP-161464, revision of RP-161321, New Orleans, USA, Sep. 19-22, 2016, 6 pages.

Huawei and Hisilicon, "Revised work item proposal: Enhancements of NB-IoT," 3GPP TSG RAN Meeting #73, RP-161901, revision of RP-161324, New Orleans, USA, Sep. 19-22, 2016, 8 pages.

Ericsson and Qualcomm, "New WID on Even further enhanced MTC for LTE," 3GPP TSG RAN Meeting #75, RP-170732, revision of RP-170465, Dubrovnik, Croatia, Mar. 6-9, 2017, 4 pages.

Huawei et al., "New WID on Further NB-IoT enhancements," #3GPP TSG RAN Meeting #75, RP-170852, Dubrovnik, Croatia, Mar. 6-9, 2017, 6 pages.

3GPP, "LTE; General Packet Radio Service (GPRS) enhancements for Evolved Universal Terrestrial Radio Access Network (E-UTRAN) access," TS 23.401, Version 12.6.0, Release 12, Sep. 2014, pp. 1-307.

3GPP, "LTE; Evolved Universal Terrestrial Radio Access (E-UTRA); User Equipment (UE) procedures in idle mode," TS 36.304, Version 14.2.0, Release 14, Apr. 2017, pp. 1-51.

3GPP, "LTE; Evolved Universal Terrestrial Radio Access (E-UTRA); Medium Access Control (MAC) protocol specification," TS 36.321, Version 12.5.0, Release 12, Apr. 2017, pp. 1-78.

Mazloum, S. et al., "Performance Analysis and Energy Optimization of Wake-Up Receiver Schemes for Wireless Low-Power Applications," Lund University, Published in: IEEE Transactions on Wireless Communications, Dec. 2014, pp. 1-12.

Hambeck, C., et al., "A 2.4 µW Wake-up Receiver for Wireless Sensor Nodes with −71 dBm Sensitivity," IEEE Proceeding International Symposium of Circuits and Systems (ISCAS), 2011, pp. 534-537.

Holma, H. and Toskala, A., "LTE for UMTS OFDMA and SC-FDMA based radio access", John Wiley and Sons, 2009, pp. 25-27.

* cited by examiner

TO REDUCE INTERFERENCE BETWEEN WAKE-UP SIGNALLING TRANSMISSIONS FROM DIFFERENT BASE STATIONS

CROSS-REFERENCE TO RELATED APPLICATIONS

The present application is based on PCT filing PCT/EP2018/080807, filed Nov. 9, 2018, which claims priority to EP 17202451.5, filed Nov. 17, 2017, the entire contents of each are incorporated herein by reference.

BACKGROUND

Field

The present disclosure relates to telecommunications apparatus and methods.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles.

One example area of current interest in this regard includes the so-called "The Internet of Things", or IoT for short. The 3GPP has proposed in Release 13 of the 3GPP specifications to develop technologies for supporting narrowband (NB)-IoT and so-called enhanced MTC (eMTC) operation using a LTE/4G wireless access interface and wireless infrastructure. More recently there have been proposals to build on these ideas in Release 14 of the 3GPP specifications with so-called enhanced NB-IoT (eNB-IoT) and further enhanced MTC (feMTC), and in Release 15 of the 3GPP specifications with so-called further enhanced NB-IoT (feNB-IoT) and even further enhanced MTC (efeMTC). See, for example, [1], [2], [3], [4]. At least some devices making use of these technologies are expected to be low complexity and inexpensive devices requiring relatively infrequent communication of relatively low bandwidth data.

The increasing use of different types of terminal devices associated with different traffic profiles gives rise to new challenges for efficiently handling communications in wireless telecommunications systems that need to be addressed.

SUMMARY

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DESCRIPTION OF EXAMPLE EMBODIMENTS

Figure 1:
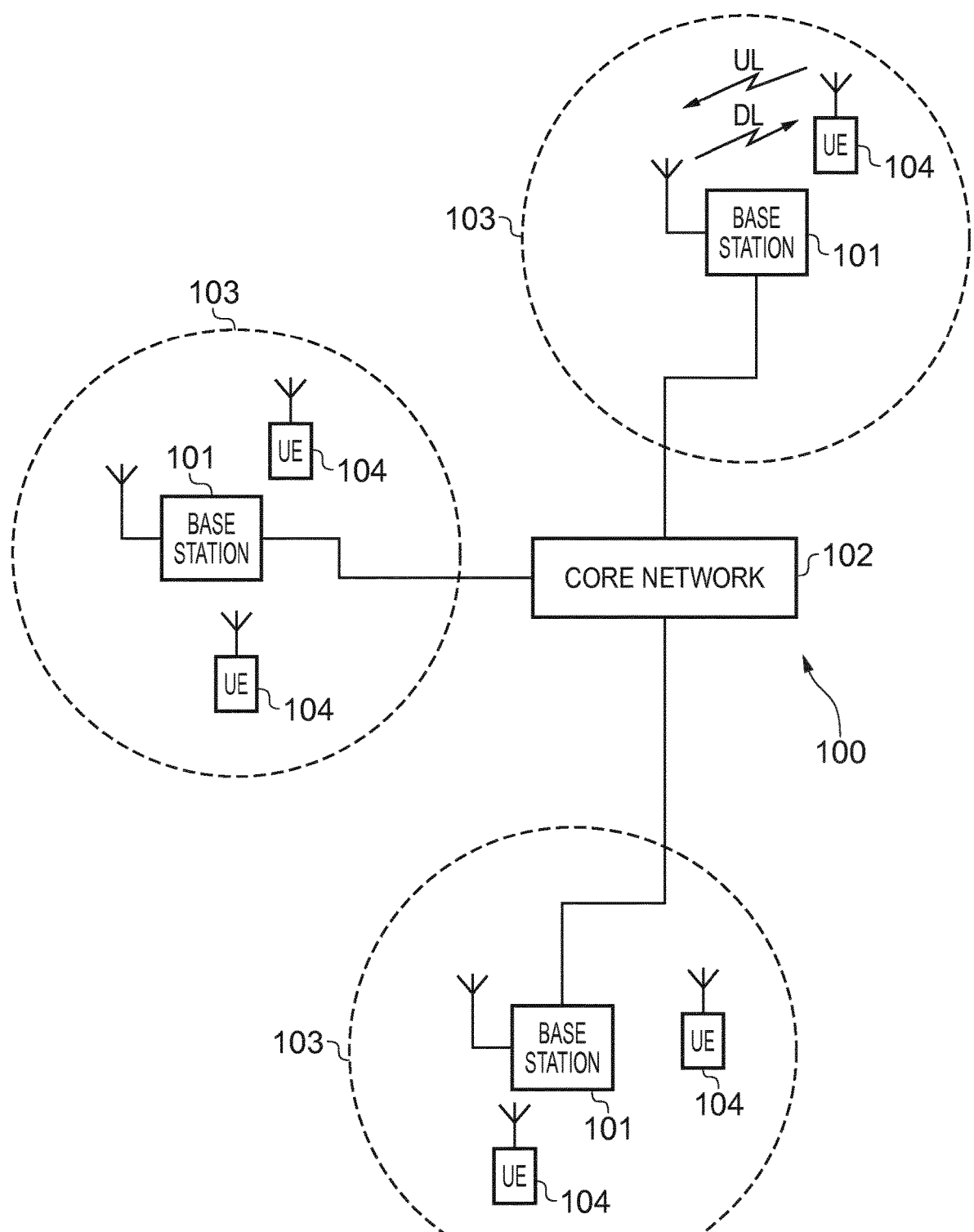
FIG. 1 schematically represents some aspects of a LTE-type wireless telecommunication system which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP (RTM) body, and also described in many books on the subject, for example, Holma H. and Toskala A [5]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The core network 102 routes data to and from the terminal devices 104 via the respective base stations 101 and provides functions such as authentication, mobility management, charging and so on. Terminal devices may also be referred to as mobile stations, user equipment (UE), user terminal, mobile radio, communications device, and so forth. Base stations, which are an example of network infrastructure equipment/network access node, may also be referred to as transceiver stations/nodeBs/e-nodeBs, g-nodeBs and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

Figure 2:
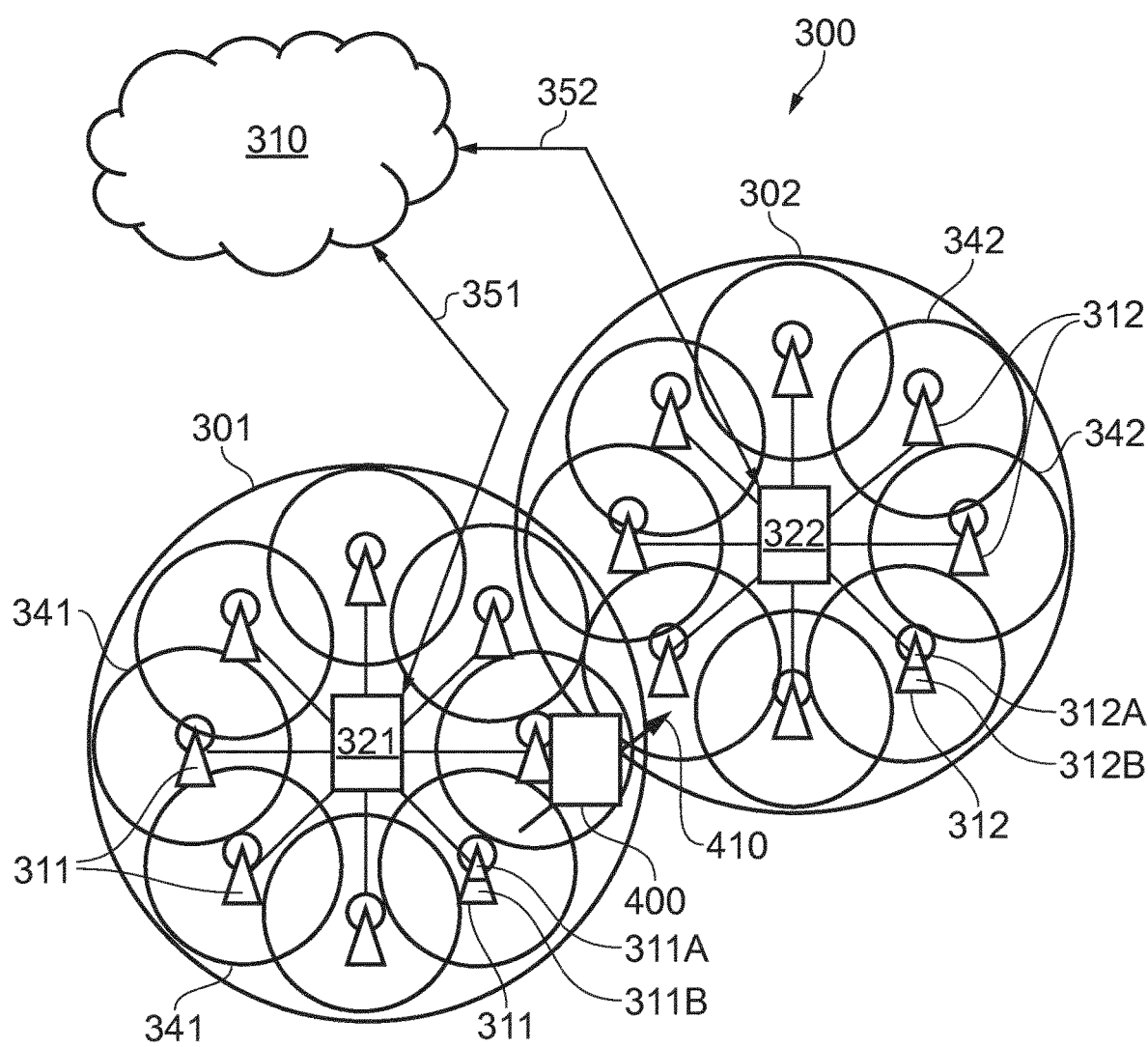
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless mobile telecommunications network/system 300 based on previously proposed approaches which may also be adapted to provide functionality in accordance with embodiments of the disclosure described herein. The new RAT network 300 represented in FIG. 2 comprises a first communication cell 301 and a second communication cell 302. Each communication cell 301, 302, comprises a controlling node (centralised unit) 321, 322 in communication with a core network component 310 over a respective wired or wireless link 351, 352. The respective controlling nodes 321, 322 are also each in communication with a plurality of distributed units (radio access nodes/remote transmission and reception points (TRPs)) 311, 312 in their respective cells. Again, these communications may be over respective wired or wireless links. The distributed units 311, 312 are responsible for providing the radio access interface for terminal devices connected to the network. Each distributed unit 311, 312 has a coverage area (radio access footprint) 341, 342 which together define the coverage of the respective communication cells 301, 302. Each distributed unit 311, 312 includes transceiver circuitry 311a, 312a for transmission and reception of wireless signals and processor circuitry 311a, 311b configured to control the respective distributed units 311, 312.

In terms of broad top-level functionality, the core network component 310 of the new RAT telecommunications system represented in FIG. 2 may be broadly considered to correspond with the core network 102 represented in FIG. 1, and the respective controlling nodes 321, 322 and their associated distributed units/TRPs 311, 312 may be broadly considered to provide functionality corresponding to base stations of FIG. 1. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the terminal devices may lie with the controlling node/centralised unit and/or the distributed units/TRPs.

A terminal device 400 is represented in FIG. 2 within the coverage area of the first communication cell 301. This terminal device 400 may thus exchange signalling with the first controlling node 321 in the first communication cell via one of the distributed units 311 associated with the first communication cell 301. In some cases communications for a given terminal device are routed through only one of the distributed units, but it will be appreciated in some other implementations communications associated with a given terminal device may be routed through more than one distributed unit, for example in a soft handover scenario and other scenarios. The particular distributed unit(s) through which a terminal device is currently connected through to the associated controlling node may be referred to as active distributed units for the terminal device. Thus the active subset of distributed units for a terminal device may comprise one or more than one distributed unit (TRP). The controlling node 321 is responsible for determining which of the distributed units 311 spanning the first communication cell 301 is responsible for radio communications with the terminal device 400 at any given time (i.e. which of the distributed units are currently active distributed units for the terminal device). Typically this will be based on measurements of radio channel conditions between the terminal device 400 and respective ones of the distributed units 311. In this regard, it will be appreciated the subset of the distributed units in a cell which are currently active for a terminal device will depend, at least in part, on the location of the terminal device within the cell (since this contributes significantly to the radio channel conditions that exist between the terminal device and respective ones of the distributed units).

In at least some implementations the involvement of the distributed units in routing communications from the terminal device to a controlling node (controlling unit) is transparent to the terminal device 400. That is to say, in some cases the terminal device may not be aware of which distributed unit is responsible for routing communications between the terminal device 400 and the controlling node 321 of the communication cell 301 in which the terminal device is currently operating. In such cases, as far as the terminal device is concerned, it simply transmits uplink data to the controlling node 321 and receives downlink data from the controlling node 321 and the terminal device has no awareness of the involvement of the distributed units 311.

However, in other embodiments, a terminal device may be aware of which distributed unit(s) are involved in its communications. Switching and scheduling of the one or more distributed units may be done at the network controlling node based on measurements by the distributed units of the terminal device uplink signal or measurements taken by the terminal device and reported to the controlling node via one or more distributed units In the example of FIG. 2, two communication cells 301, 302 and one terminal device 400 are shown for simplicity, but it will of course be appreciated that in practice the system may comprise a larger number of communication cells (each supported by a respective controlling node and plurality of distributed units) serving a larger number of terminal devices.

It will further be appreciated that FIG. 2 represents merely one example of a proposed architecture for a new RAT telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1 and 2. It will thus be appreciated the specific wireless telecommunications architecture in any given implementation is not of primary significance to the principles described herein. In this regard, certain embodiments of the disclosure may be described generally in the context of communications between network infrastructure equipment/access nodes and a terminal device, wherein the specific nature of the network infrastructure equipment/access node and the terminal device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment may comprise a control unit/controlling node 321, 322 and/or a TRP 311, 312 of the kind shown in FIG. 2 which is adapted to provide functionality in accordance with the principles described herein.

As is well understood, various wireless telecommunications networks, such as the LTE-based network represented in FIG. 1 and the NR-based network represented in FIG. 2, may support different Radio Resource Control (RRC) modes for terminal devices, typically including: (i) RRC idle mode (RRC_IDLE); and (ii) RRC connected mode (RRC_CONNECTED). When a terminal device transmits data, RRC connected mode is generally used. The RRC idle mode, on the other hand, is for terminal devices which are registered to the network (EMM-REGISTERED), but not currently in active communication (ECM-IDLE). Thus, generally speaking, in RRC connected mode a terminal device is connected to a radio network access node (e.g. an LTE base station) in the sense of being able to exchange user plane data with the radio network access node. Conversely, in RRC idle mode a terminal device is not connected to a radio network access node in the sense of not being able to communicate user plane data using the radio network access node. In idle mode the terminal device may still receive some communications from base stations, for example reference signalling for cell reselection purposes and other broadcast signalling. The RRC connection setup procedure of going from RRC idle mode to RRC connected mode may be referred to as connecting to a cell/base station. In addition to these idle and connected modes there are also proposals for other RRC modes, such as the so-called RRC_INACTIVE mode. A terminal device in RRC_INACTIVE mode is one which is not in an active RRC connected mode with the radio access network (RAN), but is considered to be RRC Connected from a CN (core network) point of view, so that data can be sent without CN-level paging, but with paging performed instead at the RAN level, to cause/trigger the terminal device to resume RRC connection (enter an RRC connected mode). This approach has the benefit of being able to allow a terminal device to enter a more power efficient state, while reducing the signalling between the CN and the RAN. The overall procedure allows RAN to take over responsibility for paging the terminal device, effectively hiding the RRC state transitions and mobility from the CN, and the CN therefore may directly send data as if the terminal device was still connected and in the same cell.

For a terminal device in RRC idle mode the core network is aware that the terminal device is present within the network, but the RAN part (comprising radio network infrastructure equipment such as the base stations 101 of FIG. 1 and/or the combined TRPs/CUs of FIG. 2) is not. The core network is aware of the location of idle mode terminal devices at a paging tracking area level but not at the level of individual transceiver entities. The core network will generally assume a terminal device is located within the tracking area(s) associated with a transceiver entity most recently used for communicating with the terminal device, unless the terminal device has since provided a specific tracking area update (TAU) to the network. (As is conventional, idle mode terminal devices are typically required to send a TAU when they detect they have entered a different tracking area to allow the core network to keep track of their location.) Because the core network tracks terminal devices at a tracking area level, it is generally not possible for the network infrastructure to know which specific transceiver entities (radio network node) to use when seeking to initiate contact with a terminal device in idle mode. Consequently when a core network is required to connect to an idle mode terminal device a paging procedure is used.

In a typical currently deployed network, terminal devices which are not connected to the network (i.e. not in RRC_CONNECTED mode) monitor for paging messages periodically. For terminal devices operating in a discontinuous reception (DRX) mode this occurs when they wake-up for their DRX awake time. Paging signals for a specific terminal device are transmitted in defined frames (Paging Frames)/sub-frames (Paging Occasions) which for a given terminal device may be derived from the International Mobile Subscriber Identifier (IMSI) of the terminal device, as well as paging related DRX parameters established in system information transmitted within the network.

In a conventional system, a terminal device thus receives and checks the contents of specific sub-frames (paging occasions) in specific frames (paging frames) to look for paging signalling. For example, in accordance with the procedures set out in 3GPP TS 36.304 version 14.2.0 Release 14 [6], a Paging Frame (PF) is a downlink radio frame which may contain one or more Paging Occasion(s) (PO), where a Paging Occasion is a sub-frame where there may be P-RNTI transmitted on PDCCH (or equivalent depending channel on implementation, e.g. MPDCCH or for NB-IOT on NPDCCH) addressing the paging message. Paging messages are conveyed on a physical downlink shared channel (PDSCH) on resources identified from an allocation message addressed to a paging radio network temporary identifier (P-RNTI) and conveyed on a physical downlink control channel (PDCCH). P-RNTI is a common identifier for all terminal devices (e.g. set at FFFE in hexa-decimal for the standard defined by 3GPP TS 36.321 version 13.5.0 Release 13 [7]). All terminal devices check whether PDCCH at specific PFs/POs configured for their use include P-RNTI or not. If there is a PDSCH allocation addressed to P-RNTI in the relevant subframe, the terminal device proceeds to seek to receive and decode the paging messages transmitted on the allocated resources on PDSCH. The terminal device then checks the list of IDs contained in the paging record list in the received paging message, to determine whether the list contains an ID corresponding to itself (for example P-TMSI or IMSI), and if so initiates a paging response.

Although the above description has summarised an example existing LTE paging procedure, it is expected that broadly similar principles may be adopted for future wireless telecommunications networks based on newer radio access technologies (RATs), such as 5G networks. The above-description of a paging procedure has referred to specific channel names which are commonly used in LTE, such as PDCCH and PDSCH, and this terminology will be used throughout this description for convenience, it being appreciated that in certain implementations different channel names may be more common. For example in the context of a wireless telecommunications system having dedicated channels for communicating with certain types of terminal device, for example MTC devices, it may be expected the corresponding channel names may be modified. For example, a physical downlink control channel dedicated for MTC devices may be referred to as MPDCCH and a corresponding physical downlink shared channel for MTC devices may be referred to as MPDSCH.

In proposed approaches for eNB-IoT and feMTC in accordance with 3GPP release 14 a terminal device in DRX in idle mode decodes PDCCH (or equivalent downlink control channel for the specific implementation at hand) to identify if there are resources scheduled on PDSCH (or equivalent downlink shared channel for the specific implementation at hand) for a paging message during paging occasions in which the terminal device might receive a paging message.

Figure 3:
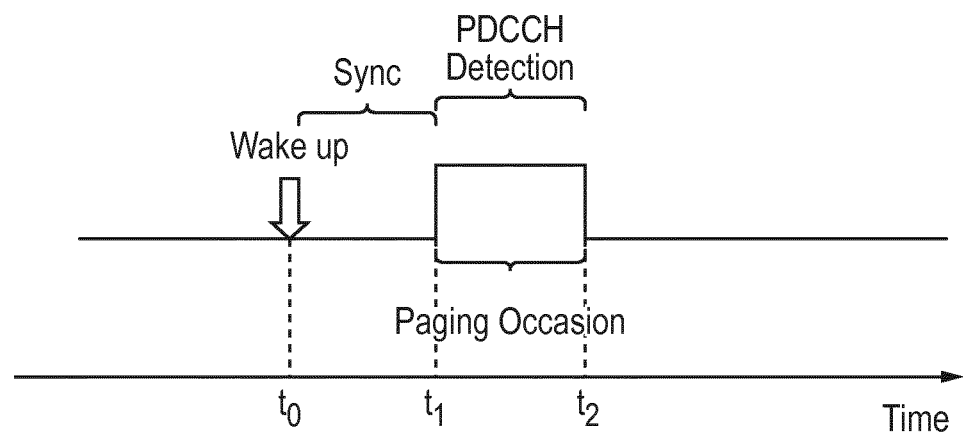
FIGS. 3 and 4 schematically represent time lines associated with paging occasions in wireless telecommunication systems based on known approaches.

FIG. 3 schematically represents a timeline of a paging occasion for a terminal device operating in a wireless telecommunications system. In the example shown in FIG. 3, one paging occasion is shown and extends from time t1 to t2. Paging occasions for a terminal device will typically occur according to a regular repeating schedule having regard to the terminal device's currently configured DRX cycle. Different terminal devices may have different DRX cycle lengths, and so have different times between paging occasions. For a terminal device having a relatively long DRX cycle/time between paging occasions, it is possible the terminal device will to some extent lose synchronisation with the radio network infrastructure equipment of the telecommunications system between paging occasions. Thus it may be helpful for a terminal devices to wake-up in advance of a paging occasion to allow it to synchronise to the wireless telecommunications system prior to the paging occasion. An example of this is schematically shown in FIG. 3 in which the terminal device wakes up at time t0 so that it can synchronise with the wireless telecommunication system in the period between times t0 and t1 so that it is able to monitor/detect PDCCH during the configured paging occasion between t1 and t2. In this regard, the process of synchronisation might in some cases only require fine adjustments to frequency and/or timing tracking loops based on detection of CRS (cell-specific reference symbols), e.g. when DRX cycles (times between paging occasions) are relatively short, or a more significant degree synchronisation may be needed, for example complete re-synchronisation by detecting PSS/SSS (primary synchronisation signals/secondary synchronisation signals) as well as using CRS, e.g. when DRX cycles (times between paging occasions) are relatively long (such that the frequency and timing of the terminal device may become significantly offset relative to that of the radio network infrastructure).

Once the terminal device has re-synchronised to the network, it will monitor PDCCH to determine if there is a paging message, and if so will go on to decode the PDSCH carrying the paging message in the usual way. If there is no paging message for the terminal device, the terminal device will go back to sleep (low power mode) until the next paging occasion. For certain types of terminal device, such as MTC devices, it may be expected paging will occur relatively rarely (e.g. once per day for a smart utility meter), and so in many cases the terminal device may wake-up and synchronise to the network to monitor PDCCH by blind decoding for a paging message when in fact there is no paging message for the terminal device. This represents an undesirable "waste" of resources, for example battery power, for the terminal device.

Proposed approaches for eNB-IoT and feMTC in accordance with 3GPP release 15 share several common objectives, and one of these objectives is to reduce power consumption associated with monitoring for paging massages. One proposal for this is to introduce what is referred to as a wake-up signal (WUS) (e.g. of the type described in C. Hambeck, et al., "A 2.4 µW Wake-up Receiver for wireless sensor nodes with −71 dBm sensitivity", in IEEE Proceeding International Symposium of Circuits and Systems (ISCAS), 2011, pp. 534-537 [8]). The proposed WUS is carried on a new physical channel and is intended to allow terminal devices to determine whether or not they need to actually decode PDCCH in an upcoming paging occasion. That is to say, whereas in accordance with previously proposed techniques a terminal device decodes PDCCH during every paging occasion to determine if there is a paging message, and if so decodes PDSCH to determine if the paging message is addressed to the terminal device, the WUS is instead intended to indicate to the terminal device whether or not the next paging occasion contains a paging message that the terminal device should decode. A WUS is transmitted at a pre-determined/derivable time in advance of a scheduled paging occasion such that a terminal device knows when to seek to receive a WUS and may contain relatively little information so that it can be decoded quickly (as compared to the blind decoding needed for PDCCH). For example, in some implementations the WUS may include a one-bit indication of whether or not there will be a paging message transmitted in the upcoming paging occasion. In some implementations the indication provided by the WUS may be based on whether or not the WUS signalling is present.

If the WUS indicates the upcoming paging occasion does include a paging message, any terminal devices for which that paging occasion applies may proceed to decode the paging message as normal to determine if the paging message is addressed to it. If the WUS indicates the upcoming paging occasion does not include any paging message, any terminal device for which that paging occasion applies can determine from this that it does not need to monitor for a paging message during the upcoming paging occasion, and so can, for example, return to a low power mode. In some implementations the WUS may include an identifier for a terminal device that is going to be paged in the paging occasion. This identifier may identify an individual terminal device or may identify a group of terminal devices. The WUS may include multiple identifiers for multiple terminal devices/groups. A terminal device which determines the WUS is associated with an identifier that applies to it may proceed to decode the paging message as normal. Conversely, a terminal device which determines the WUS is not associated with an identifier that applies to it may determine from this that it does not need to monitor for a paging message during the upcoming paging occasion and can, for example, return to a low power mode. The WUS may also be encoded with a format that enables low power decoding (e.g. the WUS may be a narrow bandwidth signal that can be decoded with low power using a low sampling rate receiver), and furthermore may be transmitted with a format that allows reliable decoding even with relatively poor synchronisation.

Figure 4:
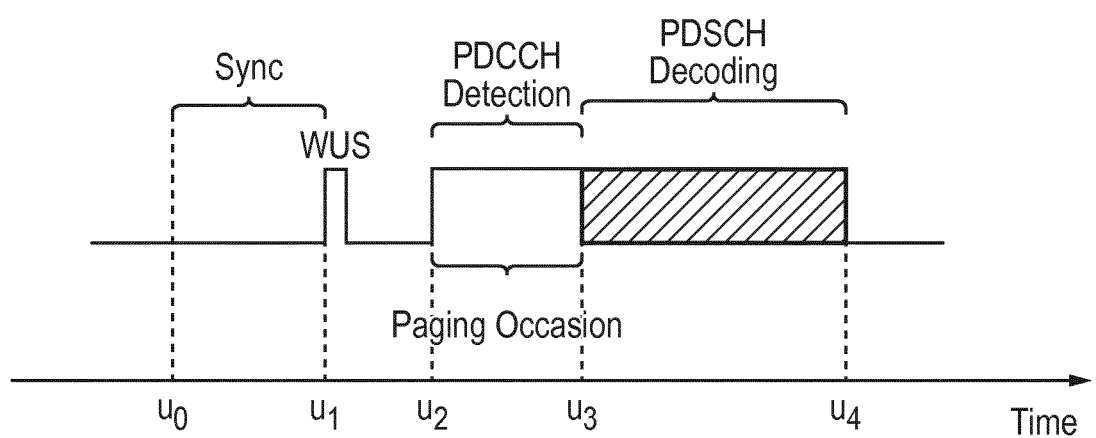

FIG. 4 schematically represents a timeline for a paging occasion for a terminal device operating in a wireless telecommunications system employing a WUS as proposed in association with 3GPP Release 15. In the example shown in FIG. 4, a paging occasion extends from time u2 to u3. As is conventional, the paging occasions will typically occur according to a regular repeating schedule having regard to the terminal device's currently configured DRX cycle.

As schematically indicated in FIG. 4, a WUS is transmitted at a predetermined/derivable time u1 in advance of the paging occasion to indicate there is a PDCCH paging message transmission for a terminal device indicated by an identifier associated with the WUS, which may identify an individual terminal device or a group of terminal devices. If the paging occasion is not scheduled to include a PDCCH paging message transmission for a terminal device, then a WUS identifying that terminal device is not sent. Thus a terminal device may be configured to seek to detect a WUS associated with an identifier for the terminal device in advance of an upcoming paging occasion. If the terminal device detects a WUS associated with an identifier for itself, the terminal device can proceed to fine tune its frequency and timing tracking loops if required and blind detects for a PDCCH between times u2 and u3, followed by decoding of the PDSCH carrying the paging message between time u3 and u4 in the usual way. If, however, the terminal device fails to detect a WUS associated with an identifier for the terminal device, the terminal device may assume there is not going to be a paging message for the terminal device in the upcoming paging occasion, and so may go back to sleep (low power mode) and not decode PDCCH in the paging occasion. As noted above, in some other implementations, the WUS might not include any indication of any specific terminal device(s)/group(s), but may instead simply include an indication of whether or not an upcoming paging occasion includes any paging message, i.e. the WUS may in effect be considered to apply to all terminal devices associated with the relevant paging occasion (this will in effect restrict power savings to paging occasions where no terminal devices are to be paged). Either way, by using WUS, a terminal device may be expected to consume less energy as it can help avoid unnecessary monitoring/blind decoding of PDCCH (or equivalent depending on the specific implementation at hand). It will be appreciated that WUS can also be used in RRC_INACTIVE mode or RRC CONNECTED mode when DRX is used.

If a terminal device is configured for a long DRX cycle (i.e. a relatively long time between paging occasions), it is possible the terminal device may lose synchronisation with the radio access network so that it is unable to decode WUS signalling without first synchronising to the radio access network. An example of this is schematically shown in FIG. 4 whereby a terminal device configured for a relatively long DRX cycle may be configured to wake-up at time u0 to allow time for it to synchronise to the radio access network before u1 so that it can detect any WUS signalling. Current proposals for feMTC synchronisation rely on using PSS/SSS in the same way as for LTE. Because PSS/SSS signalling is typically relatively sparse, e.g. only twice per radio frame in LTE, a terminal device needing to synchronise to the network using this general synchronisation signalling may need to start doing so a relatively long time in advance of an expected WUS occasion (especially for terminal devices relying on coverage enhancement techniques that rely on aggregating repeat transmissions).

To help address this issue with existing schemes relying on general synchronisation signalling, such as PSS/SSS in an LTE context, which is transmitted relatively infrequently, it has been proposed to transmit additional synchronisation signalling in association with WUS signalling. See, for example, N. S. Mazloum, O. Edfors, "Performance Analysis and Energy Optimization of Wake-Up Receiver Schemes for Wireless Low-Power Applications", IEEE Transaction on Wireless Communications, December 2014 [9]. In particular, it has been proposed to transmit WUS signalling with synchronisation signalling (e.g. a predetermined/derivable preamble/signature sequence) that can be used by terminal devices to synchronise to the network, for example using conventional correlator techniques.

Figure 5A:
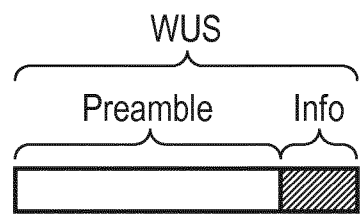
FIGS. 5A and 5B schematically represent some example structures for wake-up signalling (WUS) that may be used in accordance with certain embodiments of the disclosure.
Figure 5B:
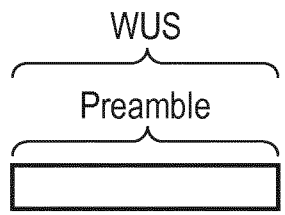

FIG. 5A schematically represents an example format for wake-up signals (WUS) that include a signature sequence (preamble) and an information part (info). The preamble part comprises signalling for terminal devices to identify the signalling as a WUS and also, in some implementations, to use to achieve synchronisation with the network (i.e. with the radio network infrastructure equipment transmitting the WUS). The information part comprises an indication of one or more terminal devices to which the WUS applies, e.g. a terminal device identifier and/or an identifier for a group of terminal devices. The terminal device/group identifier(s) may be network allocated identifiers (e.g. radio network temporary identifiers, RNTI) for the terminal device(s), or any other form of suitable identifier, e.g. based on an IMSI for a terminal device. It will be appreciated the format for the wake-up signalling may not conform to that shown in FIG. 5A, but may in other implementations have a different format. For example, the wake-up signalling may have a format in which the wake-up signalling comprises a preamble (signature sequence) without a separate information part, as schematically represented in FIG. 5B.

Instead, the preamble may itself contain an indication of the identity for the terminal device(s) for which the wake-up signalling indicates a paging message is to be subsequently transmitted, for example with specific WUS preambles (sequences/patterns) configured for specific terminal devices/groups of terminal devices.

Figure 6:
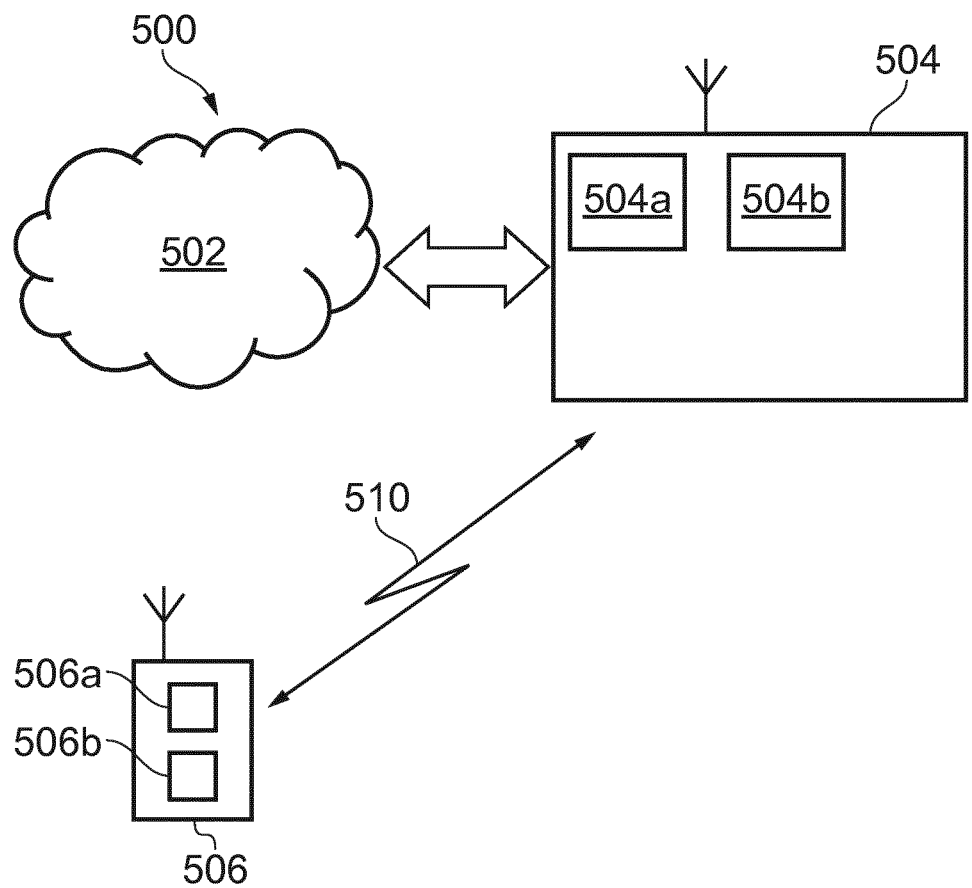
FIG. 6 schematically represents some aspects of a wireless telecommunication system in accordance with certain embodiments of the present disclosure.

FIG. 6 schematically shows some aspects of a telecommunications system 500 configured to support communications between a terminal device 506 and a network access node 504 in accordance with certain embodiments of the disclosure. Many aspects of the operation of the telecommunications system/network 500 are known and understood and are not described here in detail in the interest of brevity. Aspects of the architecture and operation of the telecommunications system 500 which are not specifically described herein may be implemented in accordance with any previously proposed techniques, for example according to current 3GPP standards and other proposals for operating wireless telecommunications systems/networks. The network access node 504 may, for convenience, sometimes be referred to herein as a base station 504, it being understood this term is used for simplicity and is not intended to imply the network access node should conform to any specific network architecture, but on the contrary, may correspond with any network infrastructure equipment/network access node that may be configured to provide functionality as described herein. In that sense it will appreciated the specific network architecture in which embodiments of the disclosure may be implemented is not of primary significance to the principles described herein.

The telecommunications system 500 comprises a core network part (evolved packet core) 502 coupled to a radio network part. The radio network part comprises the radio network access node (e.g. network access node in an LTE implementation) 504 coupled to the terminal device 506. It will of course be appreciated that in practice the radio network part may comprise a plurality of network access nodes serving a larger number of terminal devices across various communication cells. However, only a single network access node and one terminal device are shown in FIG. 6 in the interests of simplicity.

As with a conventional mobile radio network, the terminal device 506 is arranged to communicate data to and from the network access node (transceiver station/network infrastructure equipment) 504. The network access node is in turn communicatively connected to a serving gateway, S-GW, (not shown) in the core network part which is arranged to perform routing and management of mobile communications services to the terminal devices in the telecommunications system 500 via the network access node 504. In order to maintain mobility management and connectivity, the core network part 502 also includes a mobility management entity (not shown) which manages the enhanced packet service, EPS, connections with terminal devices operating in the communications system based on subscriber information stored in a home subscriber server, HSS. Other network components in the core network (also not shown for simplicity) include a policy charging and resource function, PCRF, and a packet data network gateway, PDN-GW, which provides a connection from the core network part 502 to an external packet data network, for example the Internet. As noted above, the operation of the various elements of the communications system 500 shown in FIG. 6 may be in accordance with known techniques apart from where modified to provide functionality in accordance with embodiments of the present disclosure as discussed herein.

In this example the terminal device 506 is assumed to be an MTC terminal device. The terminal device 506 may be a dedicated MTC terminal device, such as a smart meter device, or may be a generic terminal device, such as a smartphone terminal device, running an application that relies on MTC data exchange. Nonetheless, it will be appreciated the principles disclosed herein may also be applied for other types of terminal device (i.e. devices which may not be considered MTC devices). The terminal device 506 comprises transceiver circuitry 506a (which may also be referred to as a transceiver/transceiver unit) for transmission and reception of wireless signals and processor circuitry 506b (which may also be referred to as a processor/processor unit) configured to control the terminal device 506. The processor circuitry 506b may comprise various sub-units/sub-circuits for providing desired functionality as explained further herein. These sub-units may be implemented as discrete hardware elements or as appropriately configured functions of the processor circuitry. Thus the processor circuitry 506b may comprise circuitry which is suitably configured/programmed to provide the desired functionality described herein using conventional programming/configuration techniques for equipment in wireless telecommunications systems. The transceiver circuitry 506a and the processor circuitry 506b are schematically shown in FIG. 6 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). It will be appreciated the terminal device 506 will in general comprise various other elements associated with its operating functionality, for example a power source, user interface, and so forth, but these are not shown in FIG. 6 in the interests of simplicity.

The network access node 504 comprises transceiver circuitry 504a (which may also be referred to as a transceiver/transceiver unit) for transmission and reception of wireless signals and processor circuitry 504b (which may also be referred to as a processor/processor unit) configured to control the network access node 504 to operate in accordance with embodiments of the present disclosure as described herein. The processor circuitry 504b may again comprise various sub-units, such as a scheduling unit, for providing functionality in accordance with embodiments of the present disclosure as explained further below. These sub-units may be implemented as discrete hardware elements or as appropriately configured functions of the processor circuitry. Thus, the processor circuitry 504b may comprise circuitry which is suitably configured/programmed to provide the desired functionality described herein using conventional programming/configuration techniques for equipment in wireless telecommunications systems. The transceiver circuitry 504a and the processor circuitry 504b are schematically shown in FIG. 6 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). It will be appreciated the network access node 504 will in general comprise various other elements associated with its operating functionality, such as a scheduler. For example, although not shown in FIG. 6 for simplicity, the processor circuitry 504b may comprise scheduling circuitry, that is to say the processor circuitry 504b may be configured/programmed to provide the scheduling function for the network access node.

Thus, the network access node 504 is configured to communicate with the terminal device 506 over a radio communication link 510.

As noted above, WUS signalling has been proposed to trigger a terminal device to seek to decode paging signalling in a subsequent paging occasion to help reduce power consumption by the terminal device. If a terminal device (UE) is not able to correctly detect WUS signalling it can in effect become uncontactable until a recovery mechanism is applied (for example the UE may be configured to exit a power saving mode and begin seeking paging messages in the normal way if it does not receive any WUS signalling for a predetermined period). Because of this, WUS procedures should ideally be configured so there is a relatively high reliability of detection. For example, it can be helpful if WUS signalling is relatively resilient to changing radio channel conditions and able to operate down to relatively low signal to noise ratio (for example to allow paging for a UE that is in poor coverage conditions, such as an underground car park or deep within a building). Furthermore, WUS signalling may often be configured to operate in a relatively narrow bandwidth in a frequency selective channel, where the received signal may fade. If the WUS signalling is transmitted in a frequency band that is faded at the UE, the reliability of the WUS signalling will be impaired.

Figure 7:
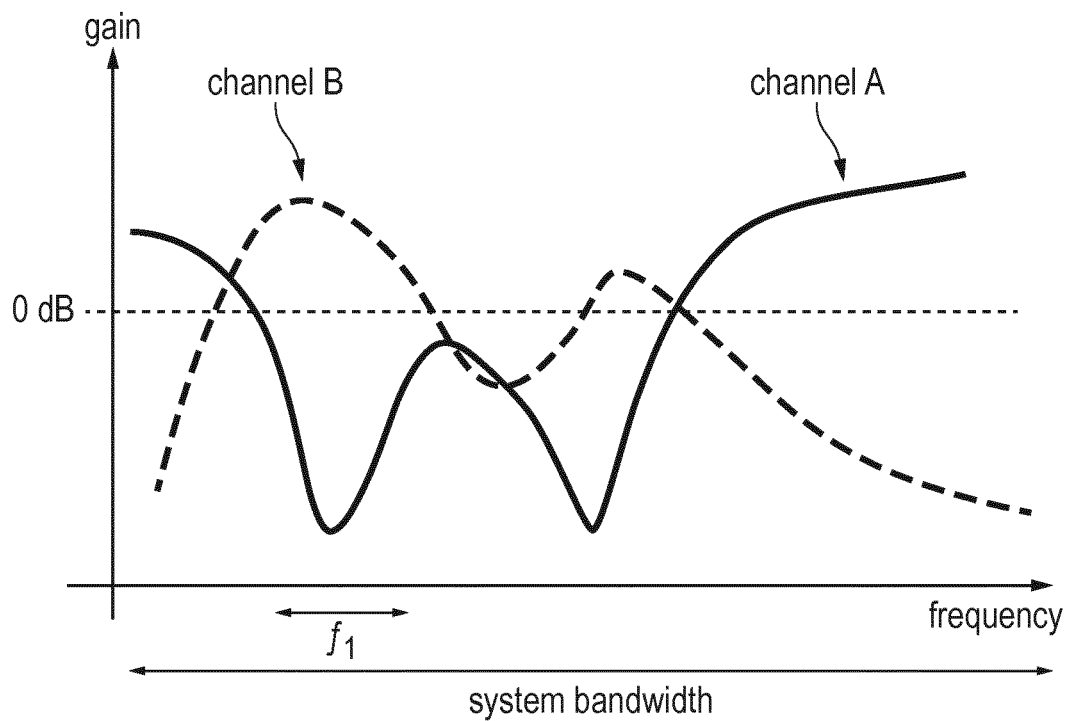
FIG. 7 is a plot schematically representing channel fading profiles for two channels.

An example of two independent fading profiles for two frequency selective fading channels is schematically shown in FIG. 7. For these example profiles a UE using channel A may have difficulty reliably decoding a WUS (i.e. WUS signalling) that is transmitted in the frequency range f1, since there is a fade in channel A in the frequency range f1. In order to improve the reliability of WUS detection in this type of circumstance, it has been proposed to use switched transmit diversity on a subframe-by-subframe basis for WUS signalling, e.g. in the 3GPP document R1-1718142, "Wake-up signal design", Qualcomm Incorporated, 3GPP TSG RAN WG1 Meeting #90bis, Prague, 9th-13th October 2017 [10]. For this approach, in some subframes WUS signalling is transmitted from a first antenna at the base station (such that the UE observes a channel such as channel A of FIG. 7 from the first antenna), and in other subframes, WUS signalling is transmitted from a second antenna at the base station (such that the UE observes a channel such as channel B of FIG. 7 from the second antenna). When such a transmit diversity scheme is applied, the reliability of the WUS (i.e. the likelihood of successful detection of WUS signalling) may be increased, since it is less likely that both transmit diversity channels are faded at the UE in the region of frequencies occupied by WUS at the times of their respective WUS transmissions. E.g. referring to FIG. 7, and assuming these profiles apply at the relevant times of the WUS transmissions in the different subframes with WUS signalling in the frequency range f1, even though channel A from the first base station transmit antenna is faded for the WUS signalling, channel B from the second base station transmit antenna is not faded, which increases the likelihood of the UE reliably decoding the WUS. Although transmit diversity may be able to improve the reliability of the WUS to some degree, increased diversity may further improve the reliability of WUS detection.

One approach for increasing diversity is to use frequency hopping. For example, in an LTE context, eMTC (enhanced machine type communication) physical channels, such as MPDCCH and PDSCH, can be frequency hopped. When these physical channels are frequency hopped, the frequency location of the transmission changes with time. The eMTC UE receives the physical channel transmitted at the different frequency locations, combines these received signals and hence achieves the benefits of frequency diversity. I.e. the physical channel experiences different over the air channels, and the composite received channel is composed of portions that have been transmitted through one frequency region of the over the air channel and portions that have been transmitted over another frequency region of the over the air channel.

Figure 8:
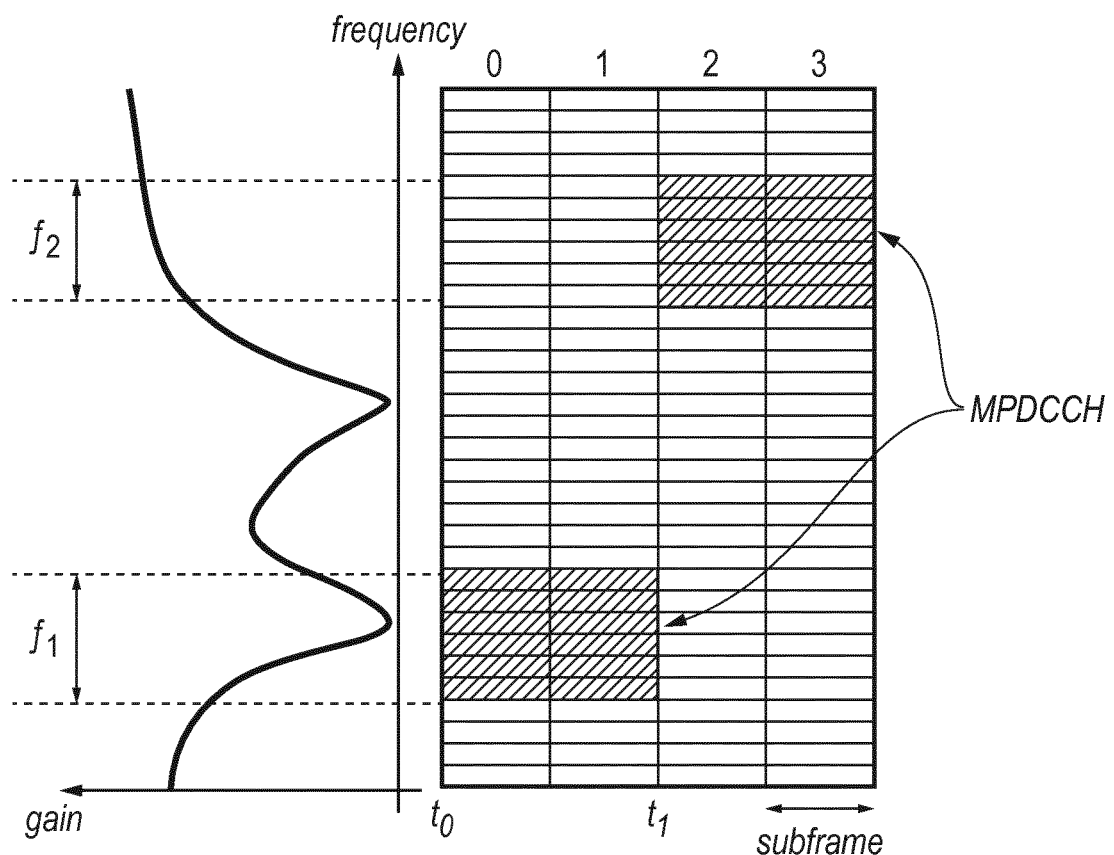
FIG. 8 schematically represents frequency hopped transmissions in a time and frequency radio resource grid and an example channel fading profile.

FIG. 8 schematically represents an example of frequency hopped transmissions for MDPCCH in a time and frequency radio resource grid (right hand side of figure) and an example channel fading profile (left hand side of figure).

Thus, the right hand side of FIG. 8 schematically represents a transmission resource grid in time (horizontal axis) and frequency (vertical axis). The grid is divided up into transmission resources comprising physical resource blocks with each spanning a number of subcarriers (e.g. twelve subcarriers) in frequency and a subframe in time. The boxes in the transmission resource grid which are shaded represent resources used for MPDCCH transmissions. The left hand side of the figure shows an example frequency selective channel fading profile representing channel conditions at different frequencies and which is assumed to apply for the duration of the MPDCCH transmissions represented in the right-hand side of the figure (i.e. for the four subframes numbered 0, 1, 2, 3).

Thus FIG. 8 shows an MPDCCH that is repeated 4 times and is transmitted across 4 subframes. The first and second subframes (numbered 0 and 1) of the MPDCCH transmissions are transmitted in 6 PRBs in the frequency range f1, starting from a time t0. The third and fourth subframes of the MPDCCH are transmitted in the frequency range f2, starting from a time t1. The UE receiver combines the signals received in the different subframes at the different frequencies, thus achieving a frequency diversity gain. The UE receiver knows the times t0 and t1 at which the MPDCCH is transmitted and the different frequency ranges f1 and f2 used in accordance with the predefined configuration for the frequency hopping. As can be seen from the left side of FIG. 8, the channel in this example is assumed to be faded at f1 and not faded at f2. Therefore, despite the relatively poor channel conditions for the MPDCCH transmissions in the first two subframes using frequency f1, the terminal device will have a better chance of reliably detecting the MPDCCH transmissions from the transmissions in the third and fourth subframes represented in FIG. 8 using frequency f2.

The inventors have recognised a potential issue with applying frequency hopping arises for WUS signalling because of timing drifts when a terminal device is in a power saving mode due to inaccuracies in the terminal device's internal clock.

The internal clock used by terminal devices to keep in sync with a serving radio access node (eNB) will drift during a DRX period. Assuming a worst case scenario in which the clock systematically drifts in one direction (either positive (fast) or negative (slow)), the longer the DRX, the further the UE's sync drifts away from that of the eNB. As an example, a typical IoT device may have a RTC (Real Time Clock) with a drift accuracy of 20 ppm. With a TPTW (where TPTW is the time between paging time windows, i.e. the time between time intervals at which paging occasions for the UE may occur) of 128 Hyper-frames (1310.72 seconds) the UE's clock may potentially drift by 26.2 ms, or about 2.5 radio frames, between paging occasions. Furthermore, since a WUS is only transmitted if there is a potential paging message for the UE, the inactive time of the UE may be some multiples of TPTW if there is no paging message for the UE in a series of paging occasions. That is to say, the drift may be compounded over several inactive PTW cycles thereby leading to a larger overall drift.

Large timing drifts (as discussed above) can reduce the benefit of frequency hopping of the kind shown in FIG. 8 because the UE will not know the correct times at which it should be monitoring each particular frequency. This is schematically represented in FIGS. 9 and 10.

Figure 9:
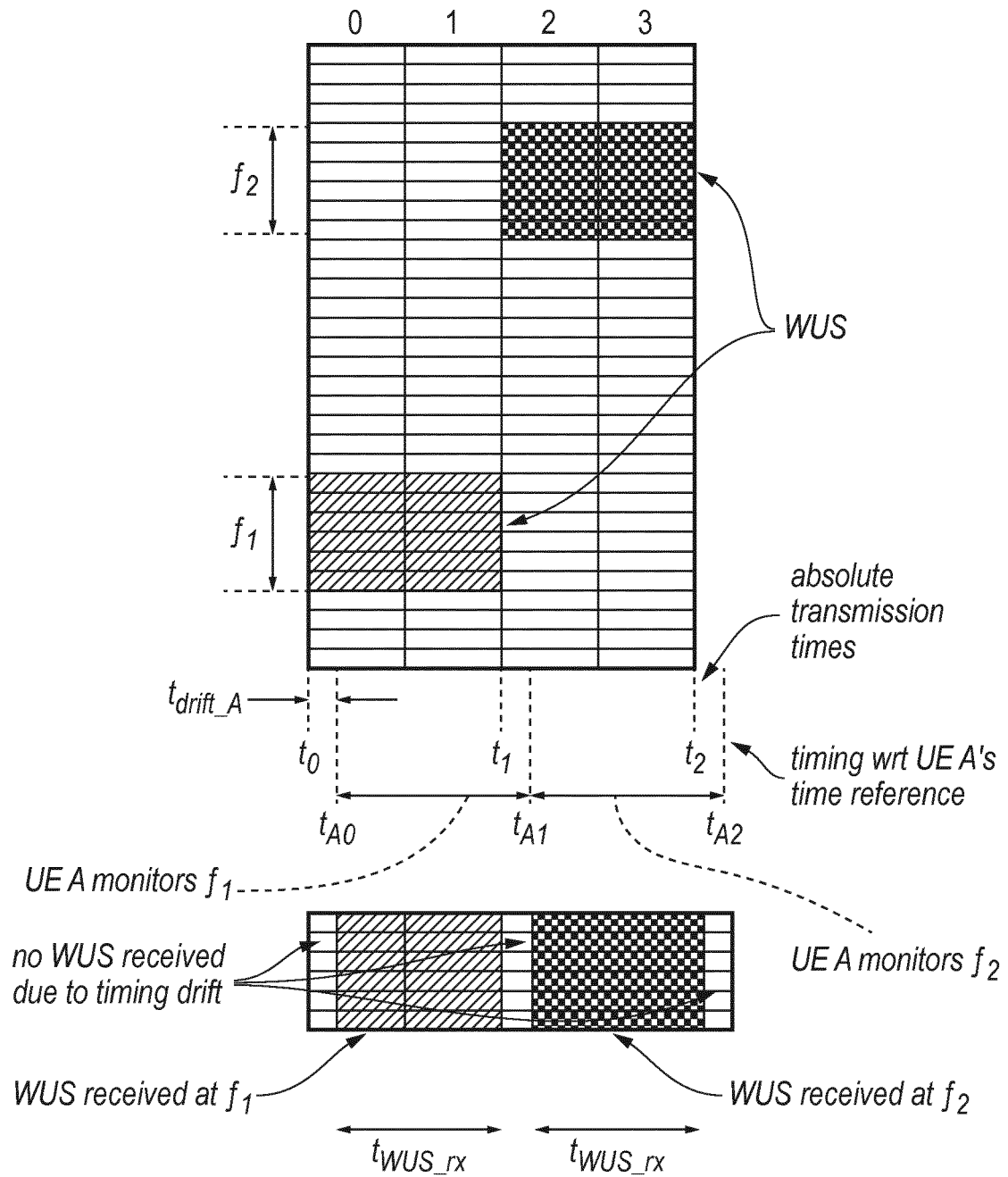
FIG. 9 schematically represents frequency hopped transmissions in a time and frequency radio resource grid and corresponding signalling received by a terminal device with a timing drift.
Figure 10:
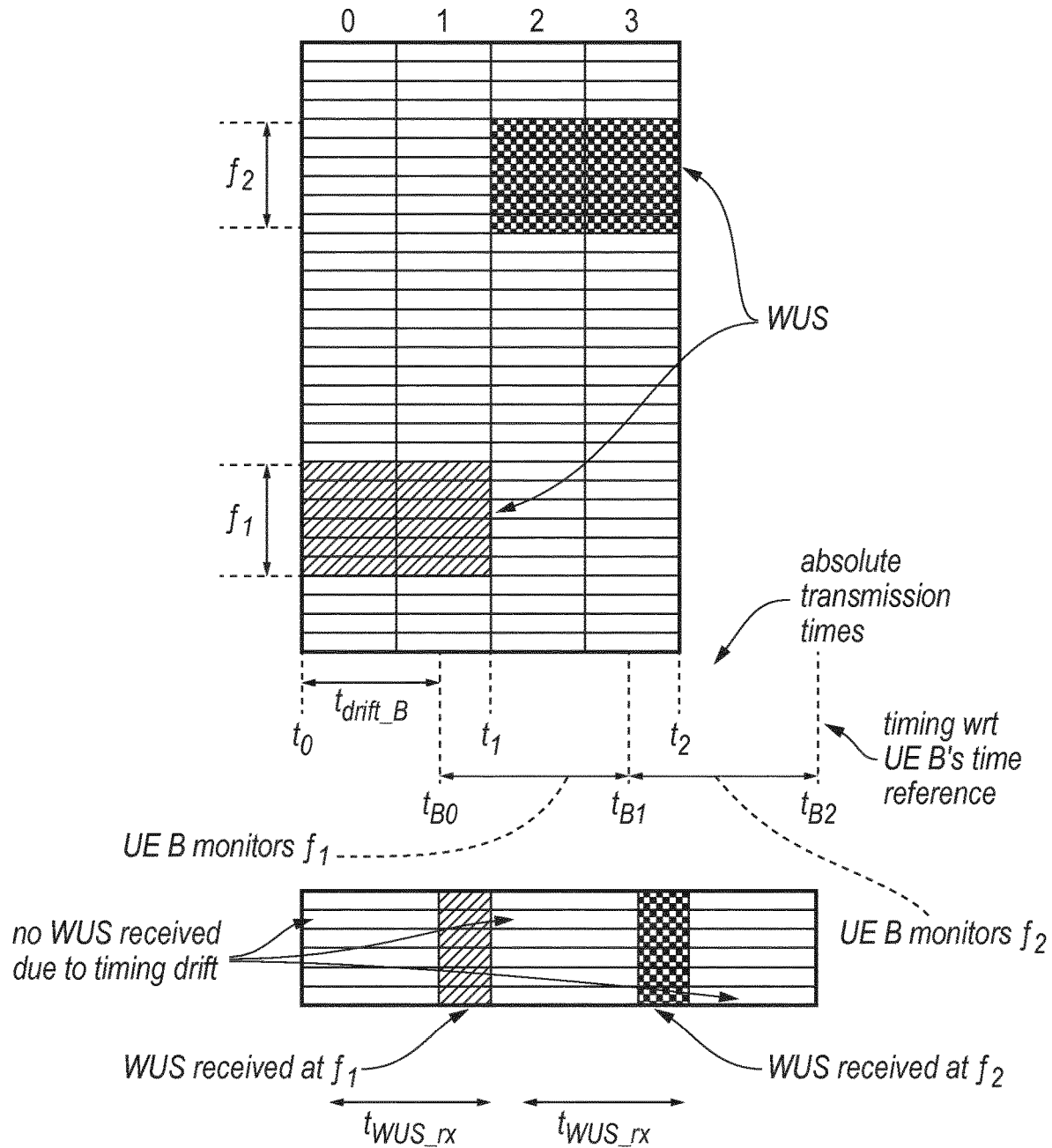
FIG. 10 schematically represents frequency hopped transmissions in a time and frequency radio resource grid and corresponding signalling received by a terminal device with a timing drift that is larger than the timing drift for the example in FIG. 9.

FIG. 9 schematically represents an example of frequency hopped transmissions for WUS signalling in a time and frequency radio resource grid (upper part of figure) and a corresponding indication of a when a terminal device UE A with a timing drift, tdrift_A, detects the WUS signalling (lower part of figure).

Thus, the upper part of FIG. 9 schematically represents a transmission resource grid in time (horizontal axis) and frequency (vertical axis). The grid is divided in frequency into transmission resources comprising physical resource blocks, PRBs, and in time into subframes. The boxes in the transmission resource grid which are shaded represent resources used for frequency hopped WUS transmissions. Thus for the example implementation in FIG. 9, the WUS signalling spans six PRBs and is hopped between frequency bands f1 and f2 with transmissions at each frequency lasting two subframes. Thus the WUS signalling is transmitted in frequency band f1 between t0 and t1 (diagonal shading) and then hops so the WUS signalling is transmitted in frequency band f2 between t1 and t2 (block shading).

The bottom part of FIG. 9 represents the WUS signalling received by the UE. Here it is assumed the UE receiver bandwidth is 6PRB (so that the WUS covers the UE's bandwidth). The UE is configured to monitor for WUS signalling in accordance with the configured hop pattern represented in the upper part of FIG. 9. However, because of the drift in its timing the UE monitoring for the different frequencies is offset from the actual transmissions on the different frequencies. As noted above, at the time that the UE monitors for WUS, the timing drift between UE A and eNodeB in this example is tdrift_A. There is hence a time difference between when the UE monitors for WUS in each frequency range and when the eNodeB transmits a WUS in that frequency range. Thus the UE starts to monitor for WUS signalling in frequency range f1 at time tA0, rather than time t0, where tA0=t0+tdrift_A. That is to say, the time for which UE A monitors for WUS signalling in frequency range f1 is offset relative to the time for which the eNodeB transmits in frequency range f1 by tdrift_A. Consequently, when the eNodeB frequency hops the WUS transmission to frequency band f2 at time t1, the terminal device continues to seek WUS signalling in frequency range f1 until time tA1, where tA1=t1+tdrift_A, at which point the terminal device frequency hops its receiver to frequency f2, when it can start receiving WUS signalling at this frequency. The WUS signalling transmissions from the eNodeB (network access node) in frequency band f2 stop at t2, but the terminal device (UE) continues to seek to detect the WUS signalling on frequency band f2 up until tA2, where tA2=t2+tdrift_A. Thus as a result of the timing drift offset the UE receives WUS signalling in each frequency range for a shorter period of time than it is transmitted. That is to say, while the eNodeB transmits at f1 for the period t1-t0 (diagonal shading in upper part of FIG. 9), the UE only detects this for the period t1-t0-tdrift_A (diagonal shading in lower part of FIG. 9). Similarly, while the eNodeB transmits at f2 for the period (t2-t1) (block shading in upper part of FIG. 9), the UE only detects this for the period t2-t1-tdrift_A (block shading in lower part of FIG. 9). Timing drifts thus lead to a loss in performance of WUS decoding because a reduced amount of the WUS signalling is received, and the larger the drift, the larger the impact.

FIG. 10 is similar to, and will be understood from, FIG. 9, but shows an example with a larger timing drift tdrift_B for a UE B, for example because UE B has a less accurate clock or has accumulated a larger drift because of an increased time since it was last synchronised to the network, as compared to UE A. The larger timing drift in the example of FIG. 10 means UE B detects a correspondingly smaller amount of the WUS signalling, as is apparent from the smaller size of the shaded areas in the bottom part of FIG. 10 compared to the bottom part of FIG. 9.

To help address some of these issues in accordance with certain embodiments of the disclosure, a radio network access node may be configured to simultaneously transmit wake-up signalling for a terminal device in two frequency bands (i.e. bands which are separated/non-contiguous in frequency) to allow the terminal device to frequency hop between the two frequency bands to benefit from frequency diversity. That is to say, WUS signalling in accordance with certain embodiments of the disclosure is simultaneously transmitted by an eNodeB in two (or more) frequency ranges and a UE may hop its receiver bandwidth to receive portions of the WUS signalling associated with a single paging occasion in more than one of the frequency ranges. Thus, in accordance with certain embodiments of the disclosure, during a wake-up signalling transmission period in advance of a paging occasion the network access node may transmit first wake-up signalling in a first frequency band f1 in a first transmission period (e.g. a first number of subframes) and transmit second wake-up signalling in a second frequency band in a second transmission period, wherein the first frequency band and the second frequency band are separated in frequency and the first transmission period and the second transmission period at least partially overlap in time such that during the period of overlap WUS signalling is transmitted at the same time (e.g. in the same subframes) in the different frequency channels. In some implementations the WUS signalling in the two frequencies may overlap entirely in time, whereas in other implementations there may be only a partial overlap, as discussed further below.

Figure 11:
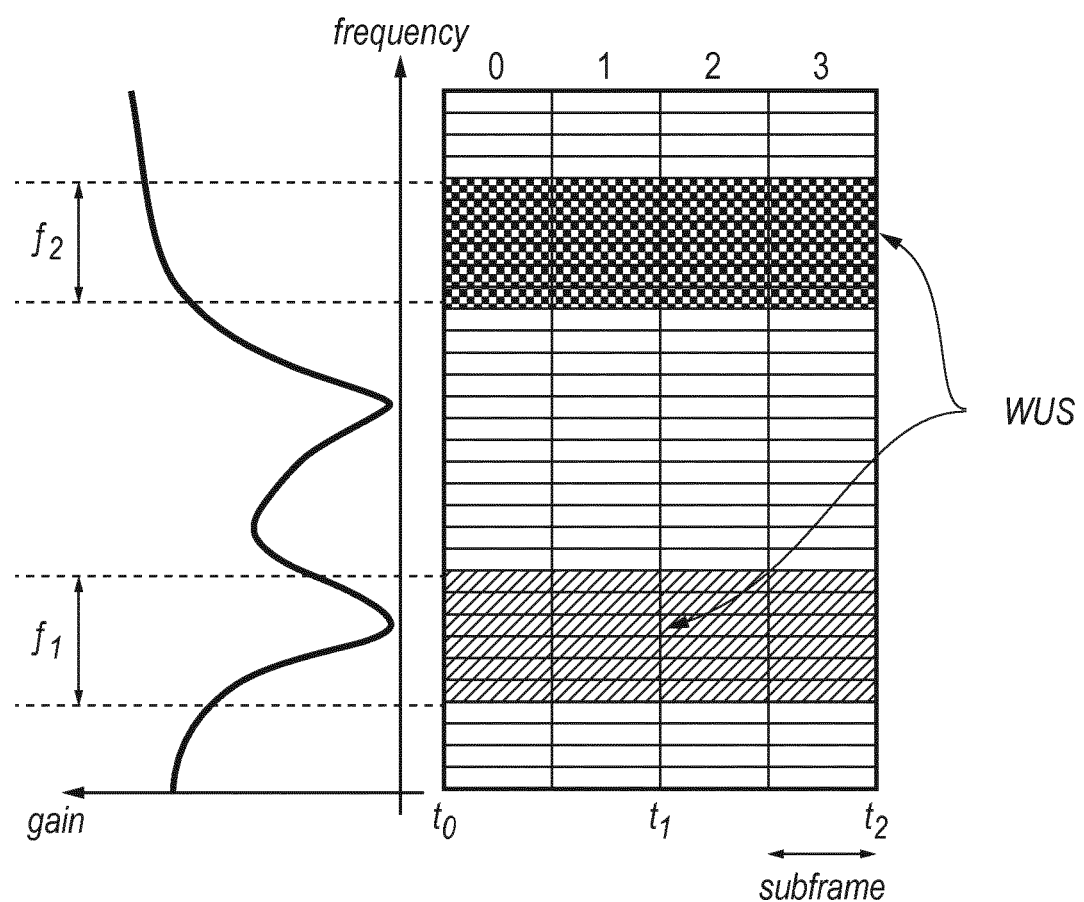
FIG. 11 schematically represents simultaneous WUS transmissions at two frequencies in a time and frequency radio resource grid and an example channel fading profile.

FIG. 11 schematically represents an example of simultaneous WUS signalling transmissions in two separate frequency bands in a time and frequency radio resource grid (right hand side of figure) and an example channel fading profile (left hand side of figure).

Thus, the right hand side of FIG. 11 schematically represents a transmission resource grid in time (horizontal axis) and frequency (vertical axis). The grid is divided into transmission resources comprising physical resource blocks with each spanning a number of subcarriers in frequency and a subframe in time. The boxes in the transmission resource grid which are shaded represent resources used for WUS signalling transmissions from a network access node in accordance with certain embodiments of the disclosure. The left hand side of the figure shows an example frequency selective channel fading profile representing channel conditions at different frequencies and which is assumed to apply for the duration of the WUS transmissions represented in the right-hand side of the figure (i.e. for the four subframes numbered 0, 1, 2, 3).

Thus FIG. 11 shows WUS signalling transmitted for four subframes in frequency band f1, which in this example spans six PRBs, (diagonal shading) and also transmitted for the same four subframes in frequency band f2, which again spans six PRBs (block shading). With this arrangement a terminal device may, for example, seek to decode WUS signalling using frequency hopping, for example by seeking to decode WUS signalling on channel f1 in subframes 0 and 1 and seeking to decode WUS signalling on channel f1 in subframes 2 and 3. Significantly, because there are WUS transmissions at the same time, the terminal device may still decode WUS signalling around its frequency hop even if it has a timing drift with respect to the radio access network (i.e. with respect to the radio resource grid represented in FIG. 11). As can be seen from the left-hand side of FIG. 11, the radio channel at frequency f1 is associated with relatively poor channel conditions, whereas the radio channel at frequency f2 is associated with relatively good channel conditions. By adopting frequency hopping the terminal device has an increased chance of receiving at least some WUS signalling over a channel with relatively good channel conditions, thereby increasing resilience to frequency-selective poor channel conditions. Furthermore, providing for simultaneous transmissions of WUS signalling on both frequency channels, can help to mitigate issues that can arising from timing drifts in the terminal device's internal clock.

Figure 12:
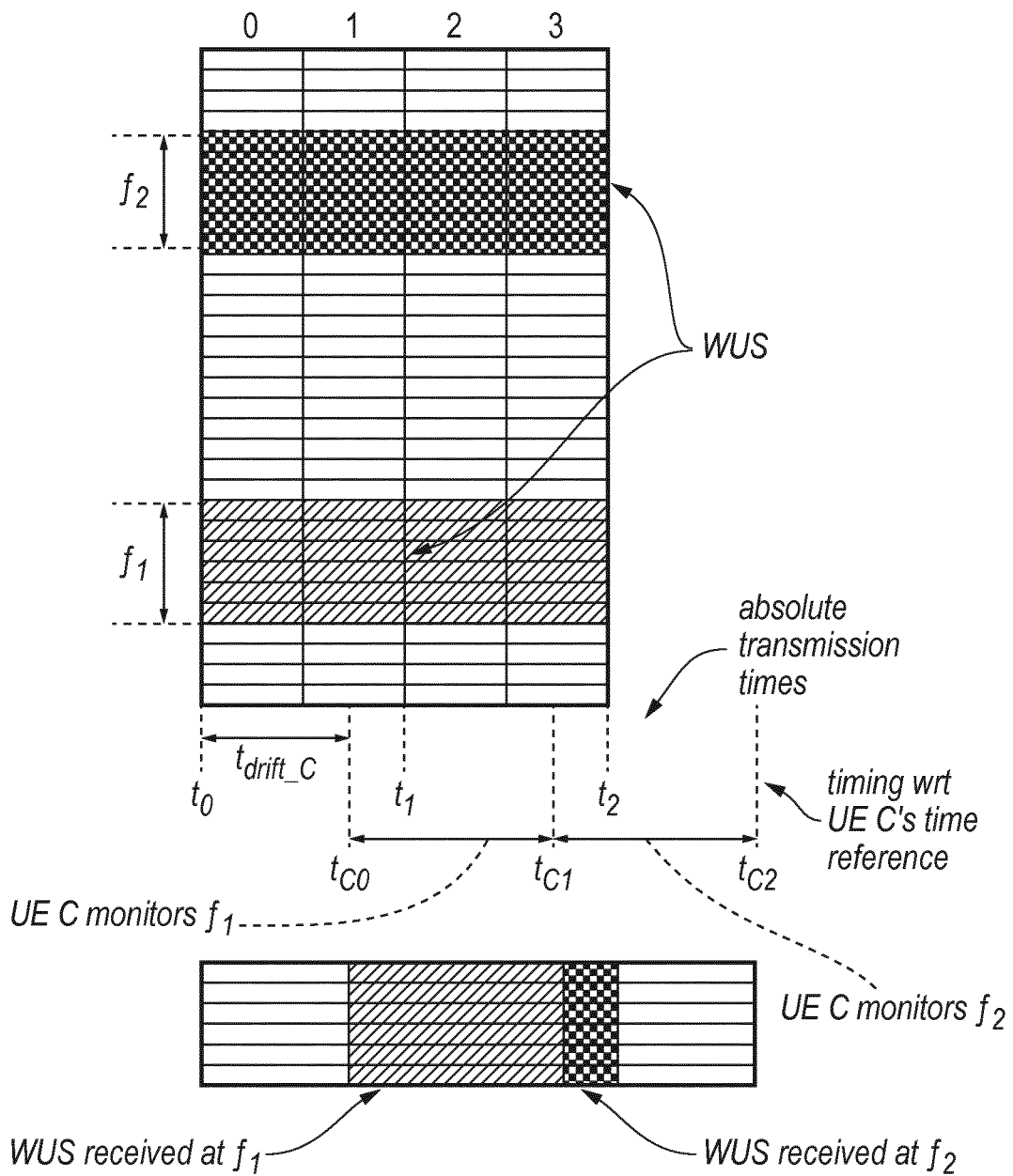
FIGS. 12 to 15 schematically represents simultaneous WUS transmissions at two frequencies in a time and frequency radio resource grid and corresponding signalling received by a terminal device with a timing drift that is similar to the timing drift for the example in FIG. 9 in accordance with different implementations of certain embodiments of the disclosure.

FIG. 12 schematically represents an example of frequency hopped reception of WUS signalling transmitted simultaneously at two separate (non-contiguous) frequencies in a time and frequency radio resource grid (upper part of figure) and a corresponding indication of when a terminal device UE C with a timing drift, tdrift_C, detects the WUS signalling (lower part of figure) in accordance with certain embodiments of the disclosure.

Thus, the upper part of FIG. 12 schematically represents a transmission resource grid in time (horizontal axis) and frequency (vertical axis). The grid is divided in frequency into transmission resources comprising physical resource blocks, PRBs, and in time into subframes (in this example four subframes). The boxes in the transmission resource grid which are shaded represent resources used for WUS transmissions in accordance with certain embodiments of the disclosure. Thus for the example implementation in FIG. 12, the WUS signalling spans six PRBs and is transmitted simultaneously in frequency bands f1 and f2 in all four subframes represented in FIG. 12. Thus the WUS signalling is simultaneously transmitted in frequency band f1 (diagonal shading) and in frequency band f2 (block shading).

The bottom part of FIG. 12 represents the WUS signalling received by the UE. Here it is assumed the UE receiver bandwidth is 6PRB (so that the WUS covers the UE's bandwidth).

The UE is configured to monitor for WUS signalling in accordance with a configured hop pattern. In this example it is assumed the terminal device is configured to monitor for WUS signalling in the frequency band f1 in subframes 0 and 1 and to monitor for WUS signalling in the frequency band f2 in subframes 3 and 4.

However, because of the drift in its timing, the times at which UE C monitors for the different frequencies is not aligned with the transmission times of the relevant subframes. As noted above, at the time that the UE monitors for WUS, the timing drift between UE C and the eNodeB in this example is assumed to be tdrift_C, which for ease of comparison with FIG. 10 is the same as the drift tdrift_B for the terminal device UE B in FIG. 10. Thus the UE C starts to monitor for WUS signalling in frequency range f1 starting at time tC0, rather than time t0, where tC0=t0+tdrift_C. That is to say, the time for which UE C monitors for WUS signalling in frequency range f1 is offset relative to the timing of the transmission subframes in which it is configured to monitor for WUS in frequency range f1. Furthermore, while the terminal device in this example is configured to hop to frequency range f2 at time t1, it does not actually do so until time tC1=t1+tdrift_C. However, because in the example approach represented in FIG. 12 the radio access node is configured to simultaneously transmit WUS signalling in both frequency channel f1 and frequency channel f2 even after the time at which the terminal device is configured to hop from monitoring frequency channel f1 to monitoring frequency channel f2, the terminal device can continue to receive WUS signalling when it is monitoring frequency channel f1 after the time at which it should have hopped to monitoring frequency channel f2 in accordance with its frequency hopping configuration. The terminal device continues to monitor WUS signalling in frequency range f1 until time tC1 (=t1+tdrift_C), at which point the terminal device frequency hops its receiver to frequency f2, when it can start receiving WUS signalling at this frequency. The WUS signalling transmissions from the eNodeB (network access node) in frequency band f2 stop at t2, but the terminal device (UE) continues to seek to detect the WUS signalling on frequency band f2 up until tC2, where tC2=t2+tdrift_C. Thus, the UE in this example receives WUS signalling on channel f1 for the period tC1-tC0 (diagonal shading in lower part of FIG. 12) and receives WUS signalling on channel f2 for the period t2-tC1 (block shading in lower part of FIG. 12). Thus, as can be seen from a comparison between the lower part of FIG. 12 and the lower part of FIG. 10, the terminal device in accordance with embodiments of the invention as represented in FIG. 12 is able to receive a greater amount of WUS signalling than the terminal device represented in FIG. 10, thereby leading to increased WUS detection reliability.

The hopping configuration described above can either be signalled to the UE by the network, e.g. in WUS configuration signalling (as transmitted in RRC unicast messages or via SIB signalling), or can be self-configured by the UE's controller circuitry 506b, e.g., according to UE implementation decisions (i.e. the UE can itself determine the timing of frequency hops to apply without configuration by the network).

The lower part of FIG. 12 shows the case where the UE starts attempting to decode WUS at time tC0 (i.e. at the time the UE clock thinks is t0). In some implementations, the UE may take account of its known maximum timing drift and start monitoring for WUS early by a corresponding amount of time. An example of this approach is represented in FIGS. 13 and 14.

Figure 13:
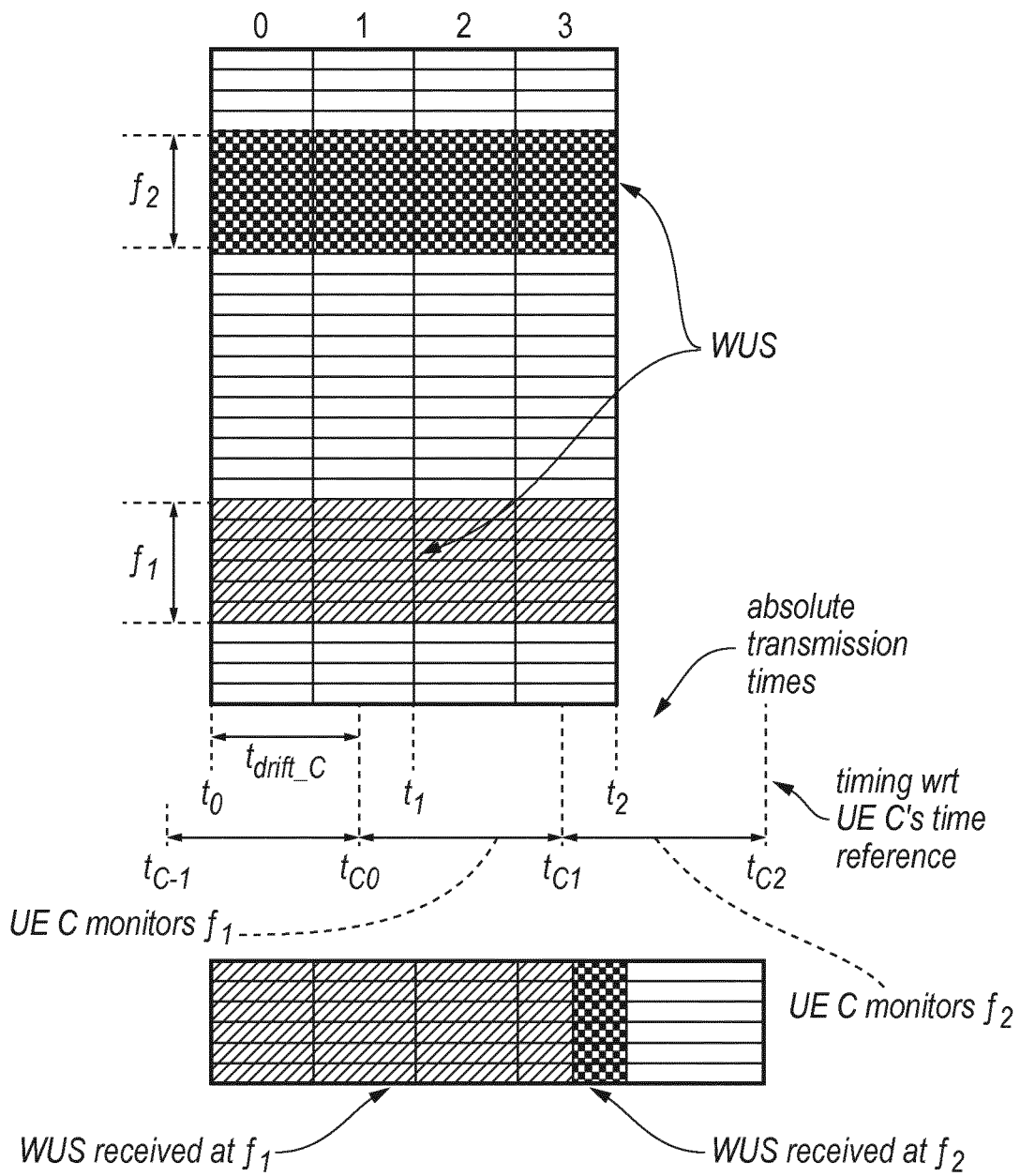
Figure 14:
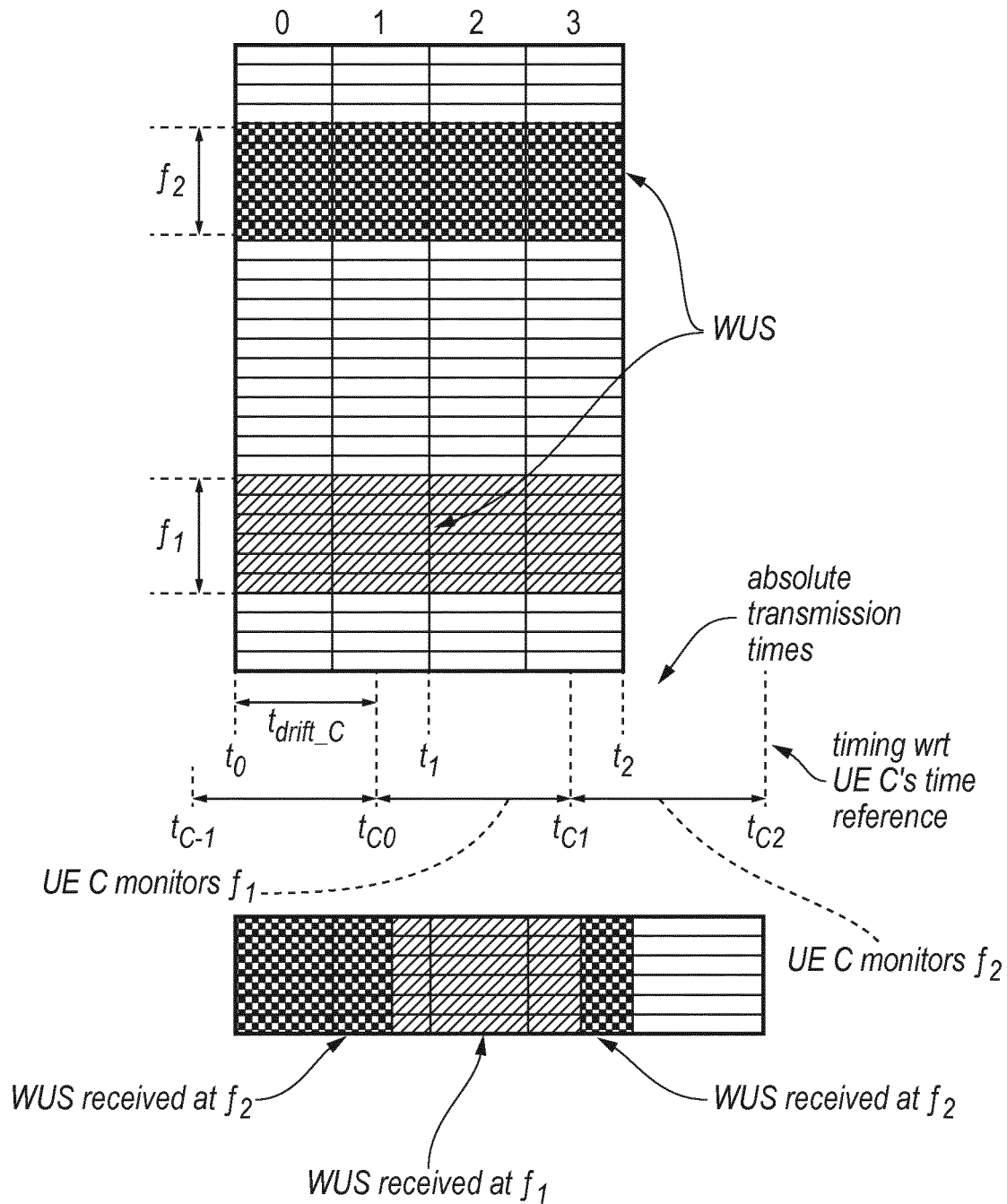

FIGS. 13 and 14 are similar to, and will be understood from, FIG. 12. However, in the examples of FIGS. 13 and 14 it is assumed the terminal device is known to have the potential for a timing drift of up to 2 subframes (it will be appreciated this is an arbitrary example value purely for the sake of example), and as such is configured to start to monitor for WUS signalling starting from the time tC-1, which is two subframes before the time tC0 (i.e. the time the terminal device determines to be time t0 according to its own slow-running clock). Consequently, even if WUS signalling is transmitted before the terminal device determines it should start being transmitted according to its own clock, the terminal device may nonetheless receive this early stage WUS signalling because it is configured to start monitoring from before the time it determines the WUS signalling should start according to its own time frame. Any WUS signalling between tC-1 and tC0 may be detected on frequency f1, as represented in FIG. 13, or may be detected on frequency f2, as represented in FIG. 14, depending on the implementation at hand. In some implementations the approach of FIG. 14 may be preferred because it can maintain a more even split in the amount of WUS signalling received on the different frequencies (i.e. better frequency diversity). Accordingly, the FIGS. 13 and 14 show some example approaches in which a terminal device may receive WUS signalling for all its configured monitoring period, even when the terminal device is not time synchronised with the wireless telecommunications network.

As an aside, it may be noted the lower part of FIG. 12 shows the reception of WUS signalling by the terminal device at frequencies f1 and f2 to be contiguous in time, in practice there may be a small delay to allow for a terminal device to retune its receiver, although it may be expected this will be a short period in comparison to the duration of a subframe, for example less than one OFDM symbol duration.

Thus the approach of simultaneously transmitting WUS signalling in different frequency channels can allow a terminal device with a timing drift to benefit from frequency diversity by frequency hopping between the different frequency channels in a way that allows for a greater amount of WUS signalling to be received than without simultaneously transmitting WUS signalling at the different frequencies. While the approach above has focused on WUS transmissions at two frequencies, it will be appreciated the same principles can apply with the transmissions at a greater number of frequencies.

Figure 15:
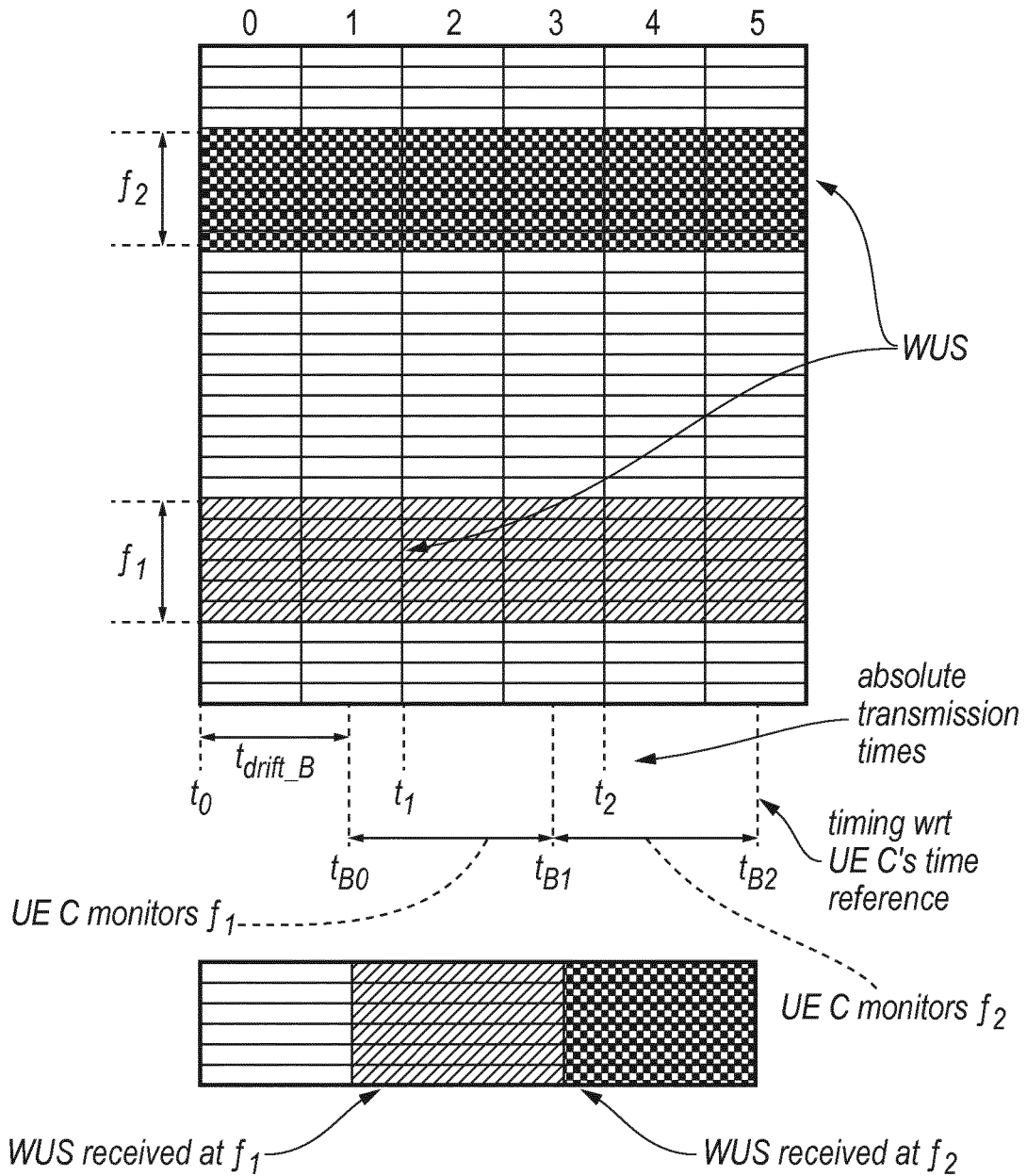

In the approach of FIG. 12, the increased amount of received WUS signalling as compared to the approach of FIG. 10 is primarily because of the overlap in transmissions on the first and second frequencies around the time the terminal device is configured to hop in frequency. In the example of FIG. 12 the terminal device clock is running slow, and so it frequency hops later than it should, but can nonetheless continue to receive WUS signalling on the first frequency channel as discussed above. Similarly, for a scenario in which the terminal device clock is running fast, and so it frequency hops earlier than it should, the UE can nonetheless start receiving WUS signalling on frequency channel f2 right away because this is transmitted simultaneously with the WUS signalling on frequency channel f1 in the period when the terminal device is configured to monitor f1 (even though it does not do so because the timing drift means its configuration is not properly applied). In the example of FIG. 12, the terminal device with a slow clock (positive timing drift) is not able to receive the same amount of WUS signalling that would be received by a terminal device with a perfect clock (zero timing drift) because the new US signalling received in frequency f2 is curtailed by the network access node stopping transmissions on f2 at time t2. In some example implementations this may be addressed by the WUS signalling transmitted by the network access node continuing for a period of time beyond the period of time the terminal device is configured to monitor for WUS signalling on channel f2. This means that if the terminal device clock is running slow, it can still continue to receive WUS signalling because the radio network access node continues to transmit the WUS signalling for a period after the period in which a terminal device with zero timing drift would stop monitoring. An example of this approach is represented in FIG. 15, which is similar to, and will be understood from, FIG. 12, but shows an example in which the network access node is configured to continue transmitting WUS signalling in two more subframes after the end of the nominally configured period for WUS transmissions—i.e. the network access node transmits WUS signalling over a longer period than the terminal device monitors for the WUS signalling. This is to allow terminal devices whose clocks are running slow to continue to receive WUS signalling throughout their entire monitoring period, as schematically indicated in the lower part of FIG. 15. Similarly, to address the corresponding issue for a terminal device with an internal clock that is running fast (negative timing drift), the WUS signalling transmitted by the network access node may start before the period of time the terminal device is configured to monitor for WUS signalling on channel f1. This means that if the terminal device clock is running fast, it can still receive WUS signalling because the radio network access node starts to transmit the WUS signalling for a period before the period in which a terminal device with zero timing drift would start monitoring.

Thus, the terminal device may be configured to monitor for WUS signalling in the first frequency band during a first monitoring period and to monitor for WUS signalling in the second frequency band during a second monitoring period, and the WUS signalling may be transmitted over a WUS transmission period, wherein the first monitoring period begins after the start of the WUS signalling transmission period and/or the second monitoring period ends before the end of the WUS signalling transmission period. Thus in some cases the combined duration of the first monitoring period and the second monitoring period is less than the duration of the wake-up signalling transmission period.

Thus, to summarise some aspects of the approach represented in FIG. 12, FIG. 12 shows a UE frequency hopping its reception of WUS every 2 subframes. However, it will be appreciated the specific periods over which the UE performs frequency hopping may be different in different implementations. For example, in some implementations WUS may occupy of the order of 40 OFDM symbols (approximately 3 subframes in LTE). To decode such a WUS, one UE implementation could monitor one frequency range for sufficient time to capture 20 OFDM symbol-worth of WUS and then switch to a second frequency range for a sufficient time to decode a second 20 OFDM symbol-worth of WUS. Another UE implementation, however, could receive one frequency range for 10 OFDM symbols, switch to a second frequency range for the next 10 OFDM symbols, and then repeat to monitor for the full duration of 40 OFDM symbols. In either case the UE may then perform a detection on the composite signal (consisting of 20 OFDM symbol sections at one frequency range and 20 OFDM symbol sections at a different frequency range) in accordance with conventional combining/aggregation techniques.

In some examples, during an during an initial phase of WUS decoding, the UE may switch between monitoring the f1 and f2 frequency ranges/bands, for example to make measurements for estimating channel conditions in the respective frequency bands. Once the UE has made a preliminary determination of which frequency range contains the most reliable signal (i.e. the best channel conditions, for example as determined by measuring a power or correlation of the WUS at both f1 and f2), the UE may switch to monitoring for the WUS in the frequency range where it estimates the WUS to be most reliable. For example, during a preliminary period the UE may perform a correlation of the WUS in frequency range f1 and then at frequency range f2. If the terminal device determines the channel conditions are better at f2, the UE may then monitor at f2 for the remainder of the WUS signalling for the current (and potentially a number of subsequent) paging occasion (PO).

In some examples, the WUS waveform/sequence transmitted by the eNodeB on each frequency may change between a preliminary stage and a subsequent stage. The WUS waveform transmitted in the preliminary stage may be optimised for allowing a UE to determine which frequency range is best for decoding the subsequent stage (i.e. channel estimation/measurement), while the WUS waveform transmitted in the subsequent stage may be optimised for reliable decoding. Thus, a UE may make measurements (e.g. correlation measurements) in the preliminary stage for each frequency, determine which frequency range has the best channel conditions, and then attempt to detect WUS signalling in that preferred frequency range.

That is to say, in some cases the first WUS signalling in the first frequency band may comprise a first phase of first WUS signalling followed by a second phase of first WUS signalling, wherein the first phase comprises signalling for the terminal device to use to estimate channel conditions for the first frequency band. Similarly, in some cases second wake-up signalling in the second frequency band comprises a first phase of second wake-up signalling followed by a second phase of second wake-up signalling, wherein the first phase comprises signalling for the terminal device to use to estimate channel conditions for the second frequency band.

Thus, if frequency range f1 is measured to be superior to frequency range f2, further WUS detection may be made in frequency range f1, but if frequency range f1 is measured to be inferior to frequency range f2, further WUS detection may instead be made in frequency range f2. If frequency range f1 is measured to have similar quality to frequency range f2, further WUS detection may be performed with the UE frequency hopping its receiver between f1 and f2.

In implementations in which the terminal device is able to dynamically select which frequency channel to monitor for WUS signalling based on channel measurements, the eNodeB may in some cases be configured to dynamically turn off simultaneous WUS transmission at the two different frequency ranges. E.g. in a heavily loaded network, the eNodeB may decide to transmit WUS at only a single frequency (or more generally, at fewer than the number of frequency bands available for WUS signalling), for example when radio resource utilisation in the network exceeds a threshold amount. The eNodeB may thus transmit the WUS with a preliminary stage for channel measurement and a subsequent stage in a single frequency range, e.g. f1. During the preliminary stage, the UE frequency hops its receiver between frequency ranges f1 and f2 in accordance with this configuration (since it is unaware that the eNodeB has stopped simultaneous transmission of WUS in two frequency ranges). Since no WUS is transmitted at f2, the UE determines that frequency range f1 is the best location to perform further decoding of the WUS and hence further decodes the WUS in frequency range f1.

In some other examples, the eNodeB may signal (e.g. via SIB signalling) that it will only transmit WUS in a single frequency range/band following the preliminary stage, but may not indicate which frequency band this is (e.g. to allow for scheduling flexibility). This signalling indicates to the UE it should choose a preferred frequency range for WUS reception during the subsequent stage (rather than frequency hopping between ranges f1 and f2).

In another embodiment that allows the eNodeB to turn off simultaneous transmission of WUS at two (or more) different frequencies, the UE frequency hops across frequency ranges where WUS potentially exists and decodes according to different hypotheses:

hypothesis 1: WUS transmitted only at f1
hypothesis 2: WUS transmitted only at f2
hypothesis 3: WUS transmitted simultaneously at f1 and f2.

In this case, the WUS can be declared to have been received if any one of the WUS transmission hypotheses leads to a metric (e.g. a correlation against a known WUS sequence) indicating that WUS was detected at the UE.

In some examples, the specific WUS sequence used in each frequency range may be different. For example, one or more of the following parameters may be different for the WUS signalling in different frequency bands: Root of Zadoff-Chu sequence; Frequency shift component; Pseudo-random number, PN, sequence Using different WUS sequences in different frequency ranges, may help to reduce interference between WUS transmissions from different base stations (e.g. if the WUS sequences used by two base stations at frequency range f1 interfere with one another, the different WUS sequences used by the two base stations at frequency range f2 may not interfere with one another).

In some implementations the frequencies (narrowbands) used for simultaneous WUS transmission may be signalled to the UE as configuration information, for example via RRC signalling or via SIB signalling. That is to say, the network access node may be operable to transmit frequency hopping configuration information to the terminal device in advance of transmitting the wake-up signalling, and in some cases, the configuration information may be transmitted to the terminal device in system information broadcast, SIB, signalling and/or radio resource control, RRC, signalling. The configuration information may comprise an indication of a location in frequency for at least one of the frequency bands and/or an indication of a first monitoring period during which the terminal device is configured to monitor for wake-up signalling in the first frequency band and a second monitoring period during which the terminal device is configured to monitor for wake-up signalling in the second frequency band.

In some cases the frequencies (narrowbands) used for simultaneous WUS transmissions may be derivable, for example from an identifier for the UE (e.g. an allocated radio network temporary identifier, RNTI) and/or an identifier for the eNB/radio access node (e.g. a cell ID). In some implementations the eNB may signal an indication of one frequency band, e.g. f1, to the UE via RRC configuration or SIB, and the UE may determine the remaining WUS frequencies or narrowbands, e.g. in accordance with a predefined mapping. Thus, in general, the location in frequency for at least one the first and second frequency bands may be derivable from an identifier for the terminal device and/or an identifier for the network access node and/or a location in frequency for the other of the first and second frequency bands in accordance with a predefined relationship.

It may be noted that while transmitting WUS simultaneously in two (or more) frequencies would use up twice (or higher multiple) more frequency resources in a given time period than transmitting WUS in one frequency channel (assuming the same channel bandwidths), the potential increase in gain obtained through frequency diversity can be expected to reduce the number of repetitions/duration of WUS signalling for a desired detection reliability, and so this may to some extent mitigate the use of additional resources.

In some examples, to help reduce the resources used by WUS signalling in accordance with certain embodiments a base station may transmit WUS signalling on channel f1 in a first transmission period and on channel f2 in a second transmission period wherein the first transmission period and the second transmission period only partially overlap (i.e. the simultaneous WUS signalling transmission of different frequencies does not occur throughout the WUS signalling transmission period, but only at certain times in the WUS signalling transmission period, and in particular around the times at which the terminal device is configured to frequency hop. In this case the amount of overlap may be selected having regard to an expected timing drift or the terminal device. For example, the duration of the overlap between the first transmission period and the second transmission period around the configured frequency hop time may be selected so that a terminal will still be able to receive signalling before and after a frequency hop regardless of whether the terminal device hops early or late due to timing drift.

Figure 16:
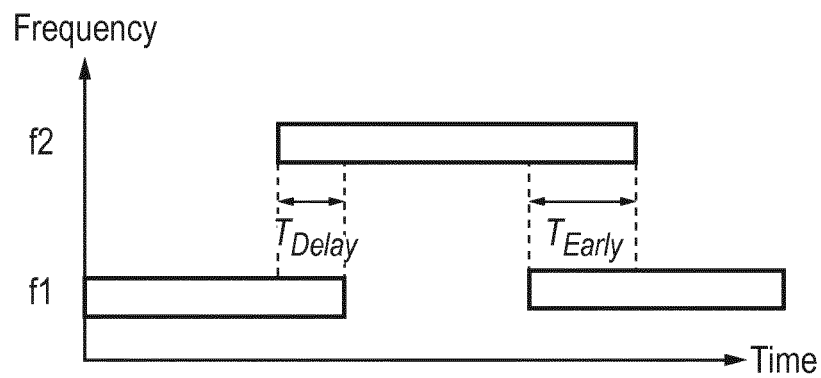
FIG. 16 schematically represents frequency hopped transmissions that overlap in time to provide simultaneous WUS transmissions at two frequencies in a time and frequency radio resource grid.

An example of this approach is schematically represented in FIG. 16. This represents by shading the regions in a time and frequency plot in which WUS signalling transmissions are made in accordance with an embodiment of the disclosure. As can be seen in the schematic example of FIG. 16, an eNB transmitting WUS in f1 and f2 may delay the termination of transmission of f1. Here the termination of the transmission of WUS in f1 is delayed by TDelay relative to the start of transmission of WUS signalling in channel f2. TDelay may take into account the maximum drift of the UE, that is to say, in some cases TDelay>drift of UE.

In another example approach, and again referring to FIG. 16, when the UE moves to f2, the WUS transmission in f1 can stop (potentially after a period of time to allow for a slow running terminal device clock), and can restart a period before the f2 transmission is stopped (to allow for a fast running terminal device clock). That is the f1 transmission may started early by TEarly before the end of f2 transmission. Assuming a terminal device is equally likely to have a fast clock as a slow clock, the middle of the overlap period may correspond with the configured frequency hop time (i.e. the time the terminal device would hop with zero timing drift). In this way, the eNB can save on frequency resources as it does not always transmit two WUS simultaneously all the time it is transmitting WUS, but only does for as long as there are sufficient overlaps between f1 and f2 to take account of the desired level of UE drifts. In practice the amount of overlap may not be selected to accommodate the worst possible drift could arise, but there may be a compromise between sub optimal WUS signalling performance for terminal devices with very large drifts and using excess resources for WUS signalling. It may be noted the frequency hopping pattern may be signalled to the UE including an indication of the overlap time whereas in other examples in which WUS is transmitted simultaneously at all times during WUS signalling, the UE may simple be configured with the frequencies (narrowbands) that contain the WUS signalling and the UE can determine its own frequency hopping pattern. The pattern can also be determined using UE ID or Cell ID, for example in accordance with a predefined relationship, instead of being explicitly configured in signalling from the network access node.

The above described embodiments have focused on examples in which the terminal device is not synchronised with the network prior to receiving the wake-up signalling (i.e. the terminal device drift is not corrected). However, in accordance with some WUS signalling approaches, WUS signalling may be based on reference symbols and the terminal device may have achieved synchronisation prior to detecting the reference symbols, in which case frequency hopping without simultaneous (e.g. overlapped) WUS transmissions may be used. That is to say, according to some aspects of the disclosure there is provided a network access node for use in a wireless telecommunications system comprising the network access node and a terminal device, wherein the network access node comprises controller circuitry and transceiver circuitry configured to operate together such that the network access node is operable to: transmit wake-up signalling for the terminal device in a wake-up signalling transmission period in advance of transmitting a paging message to indicate the terminal device should seek to decode the paging message, wherein the wake-up signalling comprises reference symbol transmissions in a first frequency band in a first transmission period in the wake-up signalling transmission period; and in a second frequency band in a second transmission period in the wake-up signalling transmission period, wherein the first frequency band and the second frequency band are separated in frequency. Furthermore, according to some aspects of the disclosure there is provided a terminal device for use in a wireless telecommunications system comprising a network access node and the terminal device, wherein the terminal device comprises controller circuitry and transceiver circuitry configured to operate together such that the terminal device is operable to: monitor for wake-up signalling from the network access node in a wake-up signalling transmission period, wherein the wake-up signalling is transmitted by the network access node in advance of a paging message to indicate the terminal device should seek to decode the paging message, wherein the wake-up signalling comprises, reference symbol transmissions by the network access node in a first frequency band in a first transmission period in the wake-up signalling transmission period and in a second frequency band in a second transmission period in the wake-up signalling transmission period, wherein the first frequency band and the second frequency band are separated in frequency.

Furthermore, while the above-described embodiments have primarily focused on wake-up signalling in respect of a paging message, similar principles can be applied in respect of other downlink signalling. For example, in a scenario in which a connected mode terminal device is configured for DRX operation, the terminal device will typically monitor PDCCH (or equivalent depending on the implementation) for allocations of resources on PDSCH (or equivalent depending on implementation) addressed to an identifier for the terminal device (for example a C-RNTI in an LTE context) during DRX wake periods. Wake-up signalling of the kind discussed above may be used to indicate to the terminal device whether or not an upcoming radio frame includes dedicated messaging for the terminal device, or whether the terminal device may return to sleep without needing to decode PDCCH. In this regard it will be appreciated the principles described above in respect of wake-up signalling for a paging message may be equally applied in respect of wake-up signalling for dedicated resource allocation messages (e.g. a message addressed to a terminal device that is radio resource connected rather than a general paging message).

Furthermore, it will be appreciated some of the approaches described above may be applied in implementations that do not use frequency hopping. One example, the approach of transmitting WUS signalling before and after a terminal device's configured WUS signalling monitoring period, for example such as discussed above, e.g. with reference to FIG. 15, could equally be applied to help accommodate timing drifts in a scenario that does not use frequency hopping. That is to say, in accordance with some example implementations there may be provided a wireless telecommunications system comprising a network access node and a terminal device, wherein the network access node comprises controller circuitry and transceiver circuitry configured to operate together such that the network access node is operable to: transmit wake-up signalling for the terminal device in a wake-up signalling transmission period in advance of transmitting a downlink paging message to indicate the terminal device should seek to decode the downlink paging message, and wherein the terminal device comprises controller circuitry and transceiver circuitry configured to operate together such that the terminal device is operable to: monitor for wake-up signalling transmitted by the network access node during a wake-up signalling monitoring period, wherein the wake-up signalling transmission period begins before the wake-up signalling monitoring period and/or the wake-up signalling transmission period ends after the wake-up signalling monitoring period.

Thus there has been described a network access node for use in a wireless telecommunications system comprising the network access node and a terminal device, wherein the network access node comprises controller circuitry and transceiver circuitry configured to operate together such that the network access node is operable to: transmit wake-up signalling for the terminal device in a wake-up signalling transmission period in advance of transmitting a paging message to indicate the terminal device should seek to decode the paging message, wherein the wake-up signalling comprises: first wake-up signalling transmitted in a first frequency band during a first transmission period in the wake-up signalling transmission period; and second wake-up signalling transmitted in a second frequency band during a second transmission period in the wake-up signalling transmission period; wherein the first frequency band and the second frequency band are separated in frequency and the first transmission period and the second transmission period at least partially overlap in time.

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein may rely on information which is predetermined/predefined in the sense of being known by both the base station and the terminal device. It will be appreciated such predetermined/predefined information may in general be established, for example, by definition in an operating standard for the wireless telecommunication system, or in previously exchanged signalling between the base station and terminal devices, for example in system information signalling, or in association with radio resource control setup signalling. That is to say, the specific manner in which the relevant predefined information is established and shared between the various elements of the wireless telecommunications system is not of primary significance to the principles of operation described herein. It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise.

That is to say, the specific manner in which the relevant information is exchanged between the various elements of the wireless telecommunications system is not of primary significance to the principles of operation described herein.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A network access node for use in a wireless telecommunications system comprising the network access node and a terminal device, wherein the network access node comprises controller circuitry and transceiver circuitry configured to operate together such that the network access node is operable to: transmit wake-up signalling for the terminal device in a wake-up signalling transmission period in advance of transmitting a downlink message to indicate the terminal device should seek to decode the downlink message, wherein the wake-up signalling comprises: first wake-up signalling transmitted in a first frequency band during a first transmission period in the wake-up signalling transmission period; and second wake-up signalling transmitted in a second frequency band during a second transmission period in the wake-up signalling transmission period; wherein the first frequency band and the second frequency band are separated in frequency and the first transmission period and the second transmission period at least partially overlap in time.

Paragraph 2. The network access node of paragraph 1, wherein the first transmission period and the second transmission period fully overlap in time.

Paragraph 3. The network access node of paragraph 1, wherein the first transmission period and the second transmission period do not fully overlap in time.

Paragraph 4. The network access node of paragraph 3, wherein the amount of overlap in time between the first transmission period and the second transmission period is determined from an estimated maximum timing drift between the terminal device and the network access node.

Paragraph 5. The network access node of any of paragraphs 1 to 4, wherein the first wake-up signalling comprises a first wake-up signalling sequence and the second wake-up signalling comprises a second wake-up signalling sequence which is different from the first wake-up signalling sequence.

Paragraph 6. The network access node of paragraph 5, wherein the first and second wake-up signalling sequences comprise: (i) Zadoff-Chu sequences with different roots; (ii) different frequency shift components; or (iii) different pseudo-random number sequences.

Paragraph 7. The network access node of any of paragraphs 1 to 6, wherein the network access node is further operable to transmit frequency hopping configuration information to the terminal device in advance of transmitting the wake-up signalling.

Paragraph 8. The network access node of paragraph 7, wherein the network access node is operable to transmit the configuration information to the terminal device in system information broadcast, SIB, signalling and/or radio resource control, RRC, signalling.

Paragraph 9. The network access node of paragraph 7 or 8, wherein the configuration information comprises an indication of a location in frequency for at least one the first and second frequency bands.

Paragraph 10. The network access node of any of paragraphs 7 to 9, wherein the configuration information comprises an indication of a first monitoring period during which the terminal device is configured to monitor for wake-up signalling in the first frequency band and a second monitoring period during which the terminal device is configured to monitor for wake-up signalling in the second frequency band.

Paragraph 11. The network access node of paragraph 10, wherein the first monitoring period begins after the start of the wake-up signalling transmission period and/or the second monitoring period ends before the end of the wake-up signalling transmission period.

Paragraph 12. The network access node of paragraph 10 or 11, wherein the combined duration of the first monitoring period and the second monitoring period is less than the duration of the wake-up signalling transmission period.

Paragraph 13. The network access node of any of paragraphs 1 to 12, wherein the location in frequency for at least one the first and second frequency bands is derivable from an identifier for the terminal device and/or an identifier for the network access node and/or a location in frequency for the other of the first and second frequency bands in accordance with a predefined relationship.

Paragraph 14. The network access node of any of paragraphs 1 to 13, wherein the first wake-up signalling comprises a first phase of first wake-up signalling followed by a second phase of first wake-up signalling, wherein the first phase comprises signalling for the terminal device to use to measure channel conditions for the first frequency band and the second wake-up signalling comprises a first phase of second wake-up signalling followed by a second phase of second wake-up signalling, wherein the first phase comprises signalling for the terminal device to use to measure channel conditions for the second frequency band.

Paragraph 15. The network access node of any of paragraphs 1 to 14, wherein network access node is further operable to suppress the transmission of wake-up signalling in one or other frequency band for at least some downlink messages if an estimate of radio resource utilisation for the network access node exceeds a threshold amount.

Paragraph 16. The network access node of any of paragraphs 1 to 15, wherein the wake-up signalling further comprises third wake-up signalling transmitted in a third frequency band during a third transmission period in the wake-up signalling transmission period, wherein the third frequency band is separated in frequency from the first and second frequency band and the third transmission period at least partially overlaps with at least one of the first and second transmission periods.

Paragraph 17. The network access node of any of paragraphs 1 to 16, wherein the downlink message is a paging message.

Paragraph 18. Circuitry for a network access node for use in a wireless telecommunications system comprising the network access node and a terminal device, wherein the circuitry comprises controller circuitry and transceiver circuitry configured to operate together such that the circuitry is operable to: transmit wake-up signalling for the terminal device in a wake-up signalling transmission period in advance of transmitting a downlink message to indicate the terminal device should seek to decode the downlink message, wherein the wake-up signalling comprises: first wake-up signalling transmitted in a first frequency band during a first transmission period in the wake-up signalling transmission period; and second wake-up signalling transmitted in a second frequency band during a second transmission period in the wake-up signalling transmission period; wherein the first frequency band and the second frequency band are separated in frequency and the first transmission period and the second transmission period at least partially overlap in time Paragraph 19. A method of operating a network access node in a wireless telecommunications system comprising the network access node and a terminal device, wherein the method comprises: transmitting wake-up signalling for the terminal device in a wake-up signalling transmission period in advance of transmitting a downlink message to indicate the terminal device should seek to decode the downlink message, wherein the wake-up signalling comprises: transmitting first wake-up signalling transmitted in a first frequency band during a first transmission period in the wake-up signalling transmission period; and transmitting second wake-up signalling transmitted in a second frequency band during a second transmission period in the wake-up signalling transmission period; wherein the first frequency band and the second frequency band are separated in frequency and the first transmission period and the second transmission period at least partially overlap in time Paragraph 20. A terminal device for use in a wireless telecommunications system comprising the terminal device and a network access node, wherein the terminal device comprises controller circuitry and transceiver circuitry configured to operate together such that the terminal device is operable to: monitor for wake-up signalling transmitted by the network access node in a wake-up signalling transmission period in advance of a downlink message to indicate the terminal device should seek to decode the downlink message, wherein the wake-up signalling comprises first wake-up signalling transmitted in a first frequency band for a first transmission period in the wake-up signalling transmission period and second wake-up signalling transmitted in a second frequency band for a second transmission period in the wake-up signalling transmission period, wherein the first frequency band and the second frequency band are separated in frequency and the first transmission period and the second transmission period at least partially overlap in time, wherein the terminal device is operable to monitor for the wake-up signalling by monitoring the first frequency band for a first monitoring period within the first transmission period before frequency hopping to monitor the second frequency band for a second monitoring period within the second transmission period.

Paragraph 21. The terminal device of paragraph 20, wherein the terminal device is further operable to perform the hop in frequency at a time of overlap of the first transmission period and the second transmission period.

Paragraph 22. The terminal device of paragraph 20 or 21, wherein the terminal device is further operable to measure channel conditions for the first frequency band when monitoring the first frequency band during the first monitoring period and to measure channel conditions for the second frequency band when monitoring the second frequency band during the second monitoring period.

Paragraph 23. The terminal device of paragraph 22, wherein the terminal device is further operable to determine which of the first frequency band and the second frequency band is associated with the best estimated channel conditions and to monitor for wake-up signalling for a remaining part of the wake-up signalling transmission period in whichever of the first frequency band and the second frequency band is determined to be associated with the best measured channel conditions.

Paragraph 24. The terminal device of paragraph 22 or 23, wherein the terminal device is further operable to determine when to perform the hop in frequency based on a comparison of the measured channel conditions for the first and second frequency bands.

Paragraph 25. The terminal device of paragraph 23, wherein the terminal device is further operable to receive configuration information from the network access node in advance of monitoring for the wake-up signalling, wherein the configuration information comprises an indication of a location in frequency for at least one the first and second frequency bands.

Paragraph 26. The terminal device of paragraph 25, wherein the terminal device is operable to receive the configuration information from the network access node in system information broadcast, SIB, signalling and/or radio resource control, RRC, signalling.

Paragraph 27. The terminal device of paragraph 26, wherein the terminal device is further operable to determine a location in frequency for at least one the first and second frequency bands from an identifier for the terminal device and/or an identifier for the network access node and/or a location in frequency for the other of the first and second frequency bands in accordance with a predefined relationship.

Paragraph 28. The terminal device of any of paragraphs 22 to 27, wherein the first monitoring period begins after the start of the wake-up signalling transmission period and/or the second monitoring period ends before the end of the wake-up signalling transmission period.

Paragraph 29. The terminal device of any of paragraphs 22 to 28, wherein the combined duration of the first monitoring period and the second monitoring period is less than the duration of the wake-up signalling transmission period.

Paragraph 30. The terminal device of any of paragraphs 22 to 29, wherein the terminal device is configured to start monitoring for WUS signalling from a start time according to its internal clock which is before the time at which the wake-up signalling transmission period is configured to start.

Paragraph 31. The terminal device of paragraph 30, wherein the difference between the start time and the time at which the wake-up signalling transmission period is configured to start is selected according to an estimated accuracy of the terminal device's internal clock.

Paragraph 32. The terminal device of any of paragraphs 22 to 31, wherein the terminal device is configured to autonomously select the times at which it monitors for wake-up signalling in the respective frequency bands during the wake-up signalling transmission period.

Paragraph 33. The terminal device of any of paragraphs 22 to 32, wherein the wake-up signalling transmitted by the radio access node for the terminal device further comprises third wake-up signalling transmitted in a third frequency band during a third transmission period in the wake-up signalling transmission period, wherein the third frequency band is separated in frequency from the first and second frequency band and the third transmission period at least partially overlaps with at least one of the first and second transmission periods, and wherein the terminal device is operable to monitor for the wake-up signalling by monitoring the third frequency band for a third monitoring period within the third transmission period after monitoring the second frequency band for the second monitoring period within the second transmission period.

Paragraph 34. Circuitry for a terminal device for use in a wireless telecommunications system comprising the terminal device and a network access node, wherein the circuitry comprises controller circuitry and transceiver circuitry configured to operate together such that the circuitry is operable to: monitor for wake-up signalling transmitted by the network access node in a wake-up signalling transmission period in advance of a downlink message to indicate the terminal device should seek to decode the downlink message, wherein the wake-up signalling comprises first wake-up signalling transmitted in a first frequency band for a first transmission period in the wake-up signalling transmission period and second wake-up signalling transmitted in a second frequency band for a second transmission period in the wake-up signalling transmission period, wherein the first frequency band and the second frequency band are separated in frequency and the first transmission period and the second transmission period at least partially overlap in time, wherein the terminal device is operable to monitor for the wake-up signalling by monitoring the first frequency band for a first monitoring period within the first transmission period before frequency hopping to monitor the second frequency band for a second monitoring period within the second transmission period.

Paragraph 35. A method of operating a terminal device in a wireless telecommunications system comprising the terminal device and a network access node, wherein the method comprises: monitoring for wake-up signalling transmitted by the network access node in a wake-up signalling transmission period in advance of a downlink message to indicate the terminal device should seek to decode the downlink message, wherein the wake-up signalling comprises first wake-up signalling transmitted in a first frequency band for a first transmission period in the wake-up signalling transmission period and second wake-up signalling transmitted in a second frequency band for a second

REFERENCES

[1] RP-161464, "Revised WID for Further Enhanced MTC for LTE," Ericsson, 3GPP TSG RAN Meeting #73, New Orleans, USA, Sep. 19-22, 2016

[2] RP-161901, "Revised work item proposal: Enhancements of NB-IoT", Huawei, HiSilicon, 3GPP TSG RAN Meeting #73, New Orleans, USA, Sep. 19-22, 2016

[3] RP-170732, "New WID on Even further enhanced MTC for LTE," Ericsson, Qualcomm, 3GPP TSG RAN Meeting #75, Dubrovnik, Croatia, Mar. 6-9, 2017

[4] RP-170852, "New WID on Further NB-IoT enhancements," Huawei, HiSilicon, Neul, 3GPP TSG RAN Meeting #75, Dubrovnik, Croatia, Mar. 6-9, 2017

[5] Holma H. and Toskala A, "LTE for UMTS OFDMA and SC-FDMA based radio access", John Wiley and Sons, 2009

[6] 3GPP TS 36.304 version 14.2.0 Release 14

[7] 3GPP TS 36.321 version 13.5.0 Release 13

[8] C. Hambeck, et al., "A 2.4 µW Wake-up Receiver for wireless sensor nodes with −71 dBm sensitivity", in IEEE Proceeding International Symposium of Circuits and Systems (ISCAS), 2011, pp. 534-537.

[9] N. S. Mazloum, O. Edfors, "Performance Analysis and Energy Optimization of Wake-Up Receiver Schemes for Wireless Low-Power Applications", IEEE Transaction on Wireless Communications, December 2014

[10] 3GPP document R1-1718142, "Wake-up signal design", Qualcomm Incorporated, 3GPP TSG RAN WG1 Meeting #90bis, Prague, 9-13 Oct. 2017

The invention claimed is:

1. A network access node for use in a wireless telecommunications system comprising the network access node and a terminal device, wherein the network access node comprises controller circuitry and transceiver circuitry configured to operate together such that the network access node is operable to:
transmit wake-up signalling for the terminal device in a wake-up signalling transmission period in advance of transmitting a downlink message to indicate the terminal device should seek to decode the downlink message, wherein the wake-up signalling comprises:
first wake-up signalling transmitted in a first frequency band during a first transmission period in the wake-up signalling transmission period; and
second wake-up signalling transmitted in a second frequency band during a second transmission period in the wake-up signalling transmission period,
wherein the first frequency band and the second frequency band are separated in frequency, and the first transmission period and the second transmission period at least partially overlap in time, and
wherein a combined duration of a first monitoring period during which the terminal device is configured to monitor for wake-up signalling in the first frequency band and a second monitoring period during which the terminal device is configured to frequency hop and monitor for wake-up signalling in the second frequency band is less than a duration of the wake-up signalling transmission period.

2. The network access node of claim 1, wherein the first transmission period and the second transmission period fully overlap in time.

3. The network access node of claim 1, wherein the first transmission period and the second transmission period do not fully overlap in time.

4. The network access node of claim 3, wherein an amount of overlap in time between the first transmission period and the second transmission period is determined from an estimated maximum timing drift between the terminal device and the network access node.

5. The network access node of claim 1, wherein the first wake-up signalling comprises a first wake-up signalling sequence and the second wake-up signalling comprises a second wake-up signalling sequence which is different from the first wake-up signalling sequence.

6. The network access node of claim 5, wherein the first and second wake-up signalling sequences comprise: (i) Zadoff-Chu sequences with different roots; (ii) different frequency shift components; or (iii) different pseudo-random number sequences.

7. The network access node of claim 1, wherein the network access node is further operable to transmit frequency hopping configuration information to the terminal device in advance of transmitting the wake-up signalling.

8. The network access node of claim 7, wherein the network access node is operable to transmit the frequency hopping configuration information to the terminal device in system information broadcast (SIB) signalling and/or radio resource control (RRC) signalling.

9. The network access node of claim 7, wherein the frequency hopping configuration information comprises an indication of a location in frequency for at least one the first and second frequency bands.

10. The network access node of claim 7, wherein the frequency hopping configuration information comprises an indication of the first monitoring period during which the terminal device is configured to monitor for wake-up signalling in the first frequency band and the second monitoring period during which the terminal device is configured to monitor for wake-up signalling in the second frequency band.

11. The network access node of claim 10, wherein the first monitoring period begins after a start of the wake-up signalling transmission period and/or the second monitoring period ends before an end of the wake-up signalling transmission period.

12. The network access node of claim 1, wherein a first location in frequency for at least one the first and second frequency bands is derivable from an identifier for the terminal device and/or an identifier for the network access node and/or a second location in frequency for the other of the first and second frequency bands in accordance with a predefined relationship.

13. The network access node of claim 1,
wherein the first wake-up signalling comprises a first phase of first wake-up signalling followed by a second phase of first wake-up signalling,
wherein the first phase comprises signalling for the terminal device to use to measure channel conditions for the first frequency band and the second wake-up signalling comprises a first phase of second wake-up signalling followed by a second phase of second wake-up signalling, and wherein the first phase comprises signalling for the terminal device to use to measure channel conditions for the second frequency band.

14. The network access node of claim 1, wherein network access node is further operable to suppress the transmission of wake-up signalling in the first frequency band or the second frequency band for at least some downlink messages under a condition that an estimate of radio resource utilization for the network access node exceeds a threshold amount.

15. The network access node of claim 1,
wherein the wake-up signalling further comprises third wake-up signalling transmitted in a third frequency band during a third transmission period in the wake-up signalling transmission period, and
wherein the third frequency band is separated in frequency from the first and second frequency band, and the third transmission period at least partially overlaps with at least one of the first and second transmission periods.

16. The network access node of claim 1, wherein the downlink message is a paging message.

17. Circuitry for a network access node for use in a wireless telecommunications system comprising the network access node and a terminal device, wherein the circuitry comprises controller circuitry and transceiver circuitry configured to operate together such that the circuitry is operable to:
transmit wake-up signalling for the terminal device in a wake-up signalling transmission period in advance of transmitting a downlink message to indicate the terminal device should seek to decode the downlink message, wherein the wake-up signalling comprises:
first wake-up signalling transmitted in a first frequency band during a first transmission period in the wake-up signalling transmission period; and
second wake-up signalling transmitted in a second frequency band during a second transmission period in the wake-up signalling transmission period;
wherein the first frequency band and the second frequency band are separated in frequency and the first transmission period and the second transmission period at least partially overlap in time,
wherein the first frequency band is contiguous in frequency,
wherein the second frequency band is contiguous in frequency, and wherein a combined duration of a first monitoring period during which the terminal device is configured to monitor for wake-up signalling in the first frequency band and a second monitoring period during which the terminal device is configured to monitor for wake-up signalling in the second frequency band is less than a duration of the wake-up signalling transmission period.

18. A terminal device for use in a wireless telecommunications system comprising the terminal device and a network access node,
wherein the terminal device comprises controller circuitry and transceiver circuitry configured to operate together such that the terminal device is operable to monitor for wake-up signalling transmitted by the network access node in a wake-up signalling transmission period in advance of a downlink message to indicate the terminal device should seek to decode the downlink message,
wherein the wake-up signalling transmitted by the network access node in the wake-up signaling transmission period comprises first wake-up signalling transmitted in a first frequency band for a first transmission period in the wake-up signalling transmission period and second wake-up signalling transmitted in a second frequency band for a second transmission period in the wake-up signalling transmission period,
wherein the first frequency band and the second frequency band are separated in frequency, and the first transmission period and the second transmission period partially overlap in time,
wherein the terminal device is operable to monitor for the wake-up signalling by monitoring the first frequency band for a first monitoring period within the first transmission period before performing a hop in frequency to monitor the second frequency band for a second monitoring period within the second transmission period, and
wherein a combined duration of the first monitoring period of the terminal device during which the terminal device monitors for wake-up signalling in the first frequency band and the second monitoring period of the terminal device during which the terminal device monitors for wake-up signalling in the second frequency band is less than a duration of the wake-up signalling transmission period of the network access node.

19. The terminal device of claim 18, wherein the terminal device is further operable to perform the hop in frequency at a time of overlap of the first transmission period and the second transmission period.

* * * * *